(12) United States Patent
Nakahara

(10) Patent No.: US 6,836,287 B1
(45) Date of Patent: Dec. 28, 2004

(54) IMAGE DISTRIBUTION SYSTEM AND METHOD OF CONTROLLING THE SAME

(75) Inventor: Masanori Nakahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,469

(22) Filed: Aug. 4, 1999

(30) Foreign Application Priority Data

Aug. 6, 1998  (JP) .......................................... 10-223031

(51) Int. Cl.[7] .......................................... H04N 5/232
(52) U.S. Cl. .............................. 348/211.12; 348/211.3
(58) Field of Search .......................... 348/211.1, 211.2, 348/211.3, 211.99, 211.11, 211.12, 207.1, 552, 14.08, 14.09, 14.1, 14.12; 702/188; 725/29, 30

(56) References Cited

U.S. PATENT DOCUMENTS

| | | | | |
|---|---|---|---|---|
| 5,218,627 A | * | 6/1993 | Corey et al. | 348/14.11 |
| 5,799,083 A | * | 8/1998 | Brothers et al. | 380/239 |
| 5,835,721 A | * | 11/1998 | Donahue et al. | 709/224 |
| 6,133,941 A | * | 10/2000 | Ono | 348/14.05 |
| 6,313,875 B1 | * | 11/2001 | Suga et al. | 348/211.99 |

* cited by examiner

Primary Examiner—Wendy R. Garber
Assistant Examiner—Timothy J. Henn
(74) Attorney, Agent, or Firm—Morgan & Finnegan, L.L.P.

(57) ABSTRACT

In an image distribution system comprising a camera controllable by an external device, a camera server having a function of digitizing and transmitting an image signal acquired by the camera via a network and a function of issuing authorization to control the camera, a viewer which receives and displays the transmitted digitized image signal, further requests to control the camera, and a network connecting the camera server and the viewer, in a case where the camera server issues the authorization to control the camera to the viewer and communication between the viewer and the camera server is undesirably terminated while the viewer holds the authorization, when the viewer restores the communication within a predetermined period, it is allowed to continuously control the camera under the same conditions as at the time of the undesired termination.

64 Claims, 16 Drawing Sheets

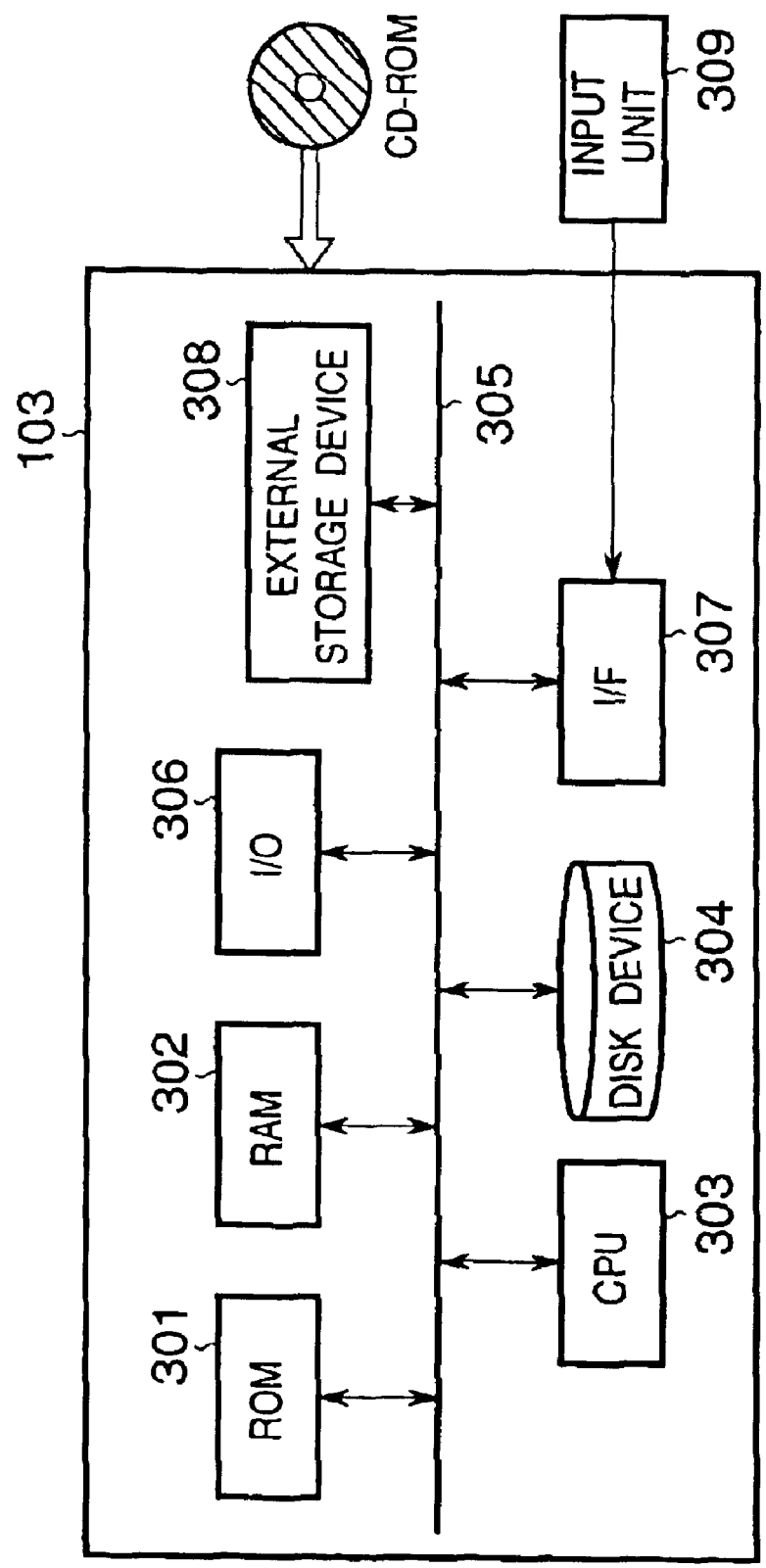

IMAGE DISTRIBUTION SYSTEM AND METHOD OF CONTROLLING THE SAME

BACKGROUND OF THE INVENTION

The present invention relates to a method of administrating authorization to control an image sensing apparatus in an image distribution system in which camera parameters (e.g., a pan angle, a tilt angle, and a zoom ratio) of the image sensing apparatus are controlled by a remote client via a network and input image signals from the image sensing apparatus are digitized and provided over the network so as to be displayed at the client side.

An image distribution system including a camera connected via a network, such as the Internet, in which an image sensed by the camera is transmitted to a plurality of clients of the image distribution system via the network so as to enable the clients at remote locations to observe the image has been developed.

Among such image distribution systems, a system which allows a client receiving an image signal from a camera, as an image sensing apparatus, to control the pan angle, tilt angle, and zoom ratio of the camera has been developed as a teleconference system, for instance.

The image distribution system of the present invention is based on such a system and allows one of a plurality of clients at a time to control the pan angle, the tilt angle, the zoom ratio, and so on, of a camera for a predetermined period of time, and requires the client to be certified and authorized to control the camera.

In such systems, when communication between the authorized client and the camera is undesirably terminated due to a problem in a communication path while the authorized client is controlling the camera, the authorized client has to repeat operations to gain certification and authorization all over again after the communication path is restored.

Recently, there are various ways to connect to the Internet, and some clients connect to the Internet via radio communication using, e.g., a portable telephone. Especially, when a client connects to the Internet via a wireless communication path, undesired termination of the communication is a problem which may frequently happen.

Further, many clients generally connect to a desired network only when they want to connect via the integrated service digital network (ISDN) or a modem, instead of being permanently connected. In such cases, it is not rare that a connection to the network is terminated for some reason.

In an image distribution system which issues authorization to control the camera to one client at a time for a predetermined period of time, when the communication between the authorized client and the camera is undesirably terminated during the predetermined time period, the right of the authorized client to control the camera for the predetermined period is infringed.

Further, if a money charging system to charge a client for the time to control the camera is adopted in the image distribution system, it is necessary to strictly administrate the authorized period and the charging of money, and a problem of how to charge for a period after sudden termination of communication during the predetermined authorization period arises since the client is not fully responsible for the termination.

Currently, the aforesaid problem is left unsolved, and when such a previously-authorized client tries to regain the authorization after the communication path is restored, the previously-authorized client is considered as a different client in most cases.

Further, by the time the previously-authorized client regains the authorization after the communication path is restored, there is a possibility that the camera has been controlled by another client using different control parameters (a pan angle, a tilt angle, and a zoom ratio) and the scene the camera is viewing is different from the scene where the previously-authorized client controlled the camera to view.

SUMMARY OF THE INVENTION

The present invention has been made in consideration of the above situation, and has as its object to, when communication between a client and a camera is undesirably terminated while the client possesses authorization to control the camera and the client restores a communication path within a predetermined period of time, allow the client to continue to control the camera under the same camera conditions as at the time of the undesired termination, thereby providing an image distribution system and method of controlling the image distribution system capable of controlling the overall system while taking troubles in communication into consideration.

According to the present invention, the foregoing object is obtained by providing an image distribution system comprising: an image sensing apparatus controllable by an external device; an image transmission apparatus having a function of digitizing and transmitting an image signal acquired by the image sensing apparatus via a network and a function of issuing authorization to control the image sensing apparatus; an image reception apparatus which receives and displays the transmitted digitized image signal, further requests to control the image sensing apparatus; and a network connecting the image transmission apparatus and the image reception apparatus, wherein, in a case where the image transmission apparatus issues the authorization to control the image sensing apparatus to the image reception apparatus and communication between the image reception apparatus and the image transmission apparatus is undesirably terminated while the image reception apparatus holds the authorization, by restoring the communication within a predetermined period, the image reception apparatus is allowed to continuously control the image sensing apparatus under the same conditions as at the time of the undesired termination.

Further, according to the present invention, the foregoing object is also obtained by providing a control method for controlling an image distribution system having an image sensing apparatus controllable by an external device, an image transmission apparatus having a function of digitizing and transmitting an image signal acquired by the image sensing apparatus via a network and a function of issuing authorization to control the image sensing apparatus, an image reception apparatus which receives and displays the transmitted digitized image signal, further requests to control the image sensing apparatus, and a network connecting the image transmission apparatus and the image reception apparatus, wherein, in a case where the authorization to control the image sensing apparatus is issued to the image reception apparatus and communication between the image reception apparatus and the image transmission apparatus is undesirably terminated while the image reception apparatus holds the authorization, the image reception apparatus is allowed to continuously control the image sensing apparatus under the same conditions as at the time of the undesired termination if the image reception apparatus restores communication within a predetermined period.

Furthermore, according to the present invention, the foregoing object is also attained by providing a computer program product comprising a computer usable medium having computer readable program code means embodied in the medium of a control method for controlling an image distribution system having an image sensing apparatus controllable by an external device, an image transmission apparatus having a function of digitizing and transmitting an image signal acquired by the image sensing apparatus via a network and a function of issuing authorization to control the image sensing apparatus, an image reception apparatus which receives and displays the transmitted digitized image signal, further requests to control the image sensing apparatus, and a network connecting the image transmission apparatus and the image reception apparatus, the product including computer readable program code means for, in a case where the authorization to control the image sensing apparatus is issued to the image reception apparatus and communication between the image reception apparatus and the image transmission apparatus is undesirably terminated while the image reception apparatus holds the authorization, enabling the image reception apparatus to continuously control the image sensing apparatus under the same conditions as at the time of the undesired termination if the image reception apparatus restores communication within a predetermined period.

Further, according to the present invention, the foregoing object is also attained by providing an image transmission apparatus, used in connection with an image sensing apparatus controllable by an external device, having a function of digitizing and transmitting an image signal acquired by the image sensing apparatus via a network and a function of issuing authorization to control the image sensing apparatus, wherein, in a case where the image transmission apparatus issues the authorization to control the image sensing apparatus to an external apparatus and communication between the external apparatus and the image transmission apparatus is undesirably terminated while the external apparatus holds the authorization, the image transmission apparatus allows the external apparatus to continuously control the image sensing apparatus under the same conditions as at the time of the undesired termination if the external apparatus restores the communication within a predetermined period.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a block diagram illustrating a configuration of a general computer used as the camera server of the present invention;

DETAILED DESCRIPTION OF THE PREFERRED EMBODIMENTS

Preferred embodiments of the present invention will be described in detail below in accordance with the accompanying drawings.

<First Embodiment>

Figure 1:
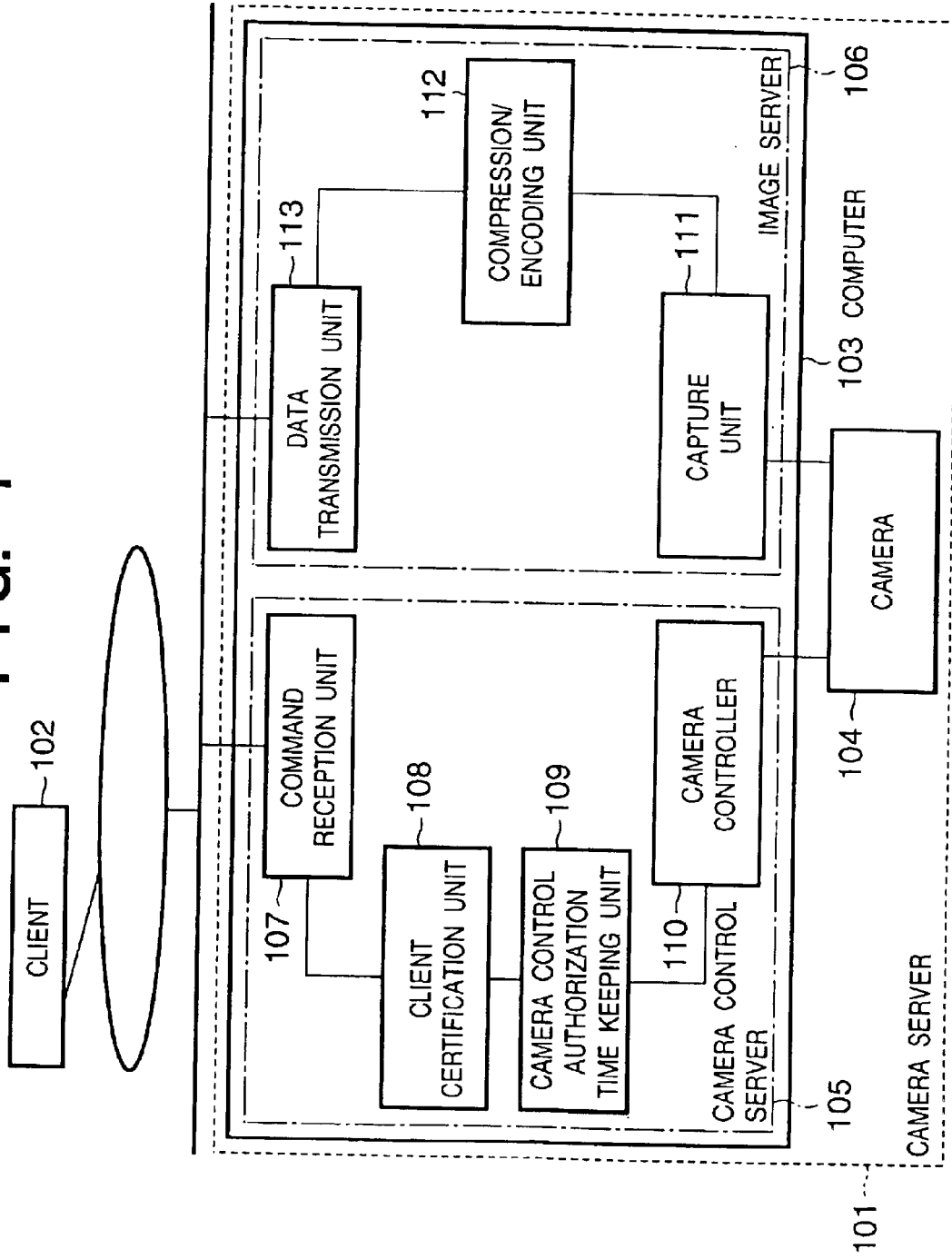
FIG. 1 is a block diagram illustrating a configuration of an image distribution system according to embodiments of the present invention.

FIG. 1 is a block diagram illustrating a configuration of an image distribution system according to the first embodiment of the present invention. The image distribution system mainly configured with a camera server 101, which is an image transmission apparatus, and a client 102, which is an image reception apparatus. The camera server 101 is mainly configured with a computer 103 and a camera 104. The camera 104 is connected to the computer 103 via a cable, such as an RS232C cable, and can be controlled to tilt, pan, and zoom (referred to as "camera control" hereinafter), for instance, by the computer 103. The computer 103 includes two modules of a camera control server 105 for administrating the camera control and an image server 106 for administrating image distribution operation.

Reference numerals 107 to 110 are configuration elements of the camera control server 105. Specifically, reference 107 denotes a command reception unit for receiving a request for controlling the camera from a remote client; 108, a client certification unit for certifying whether or not a client is allowed to control the camera; 109, a camera control authorization time keeping unit for issuing authorization to control the camera for a predetermined period; and 110, a camera controller for sending commands for panning and tilting, for instance, to the camera 104 in accordance with a request from the client 102.

Reference numerals 111 to 113 are configuration elements of the image server 106. More specifically, reference numeral 111 denotes a capture unit for capturing image data obtained by the camera 104; 112, a compression/encoding unit for compressing and encoding the captured image data; and 113, a data transmission unit for transmitting the encoded data to a client via a network by packets. An analog video signal of, e.g., NTSC composite signal format outputted from the camera 104 is converted into digital R, G and B signals or digital Y, U and V signals by the capture unit 111. The converted image data is compressed by the compression/encoding unit 112 which adopts a known compression/encoding method, such as JPEG or MPEG, thereby converted into compressed data, then divided into packets by the data transmission unit 113, finally sent to a client. Note that any compression/encoding method, such as H.261 and H.263 methods, may be used in the compression/encoding unit 112.

Figure 2:
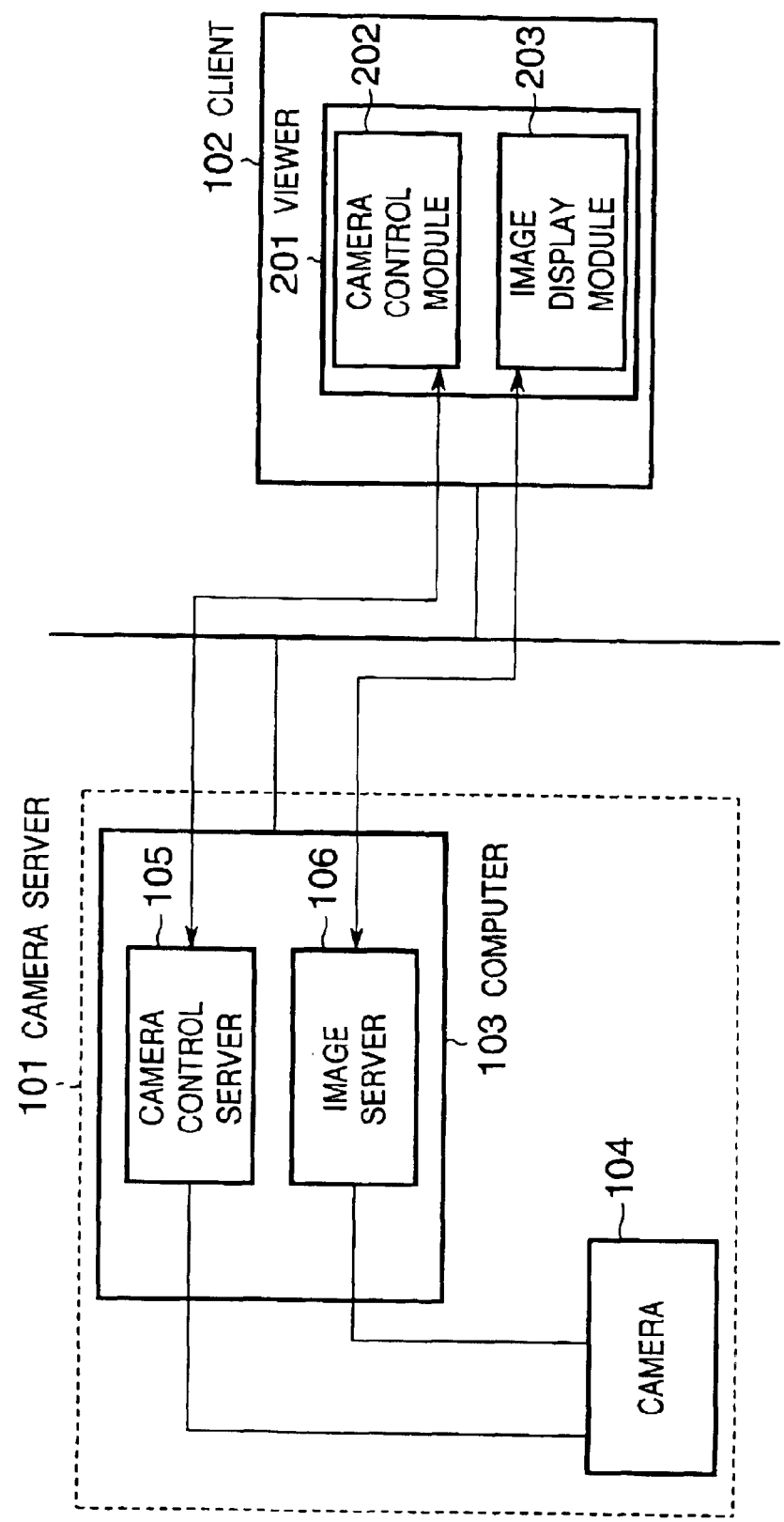
FIG. 2 is a block diagram illustrating relationship between an image transmission apparatus and an image reception apparatus of the present invention.

FIG. 2 shows relationship between the client 102 and the camera server 101. The client 102 is a computer connectable to a network, and a viewer 201, an application program, is executed in the computer. The viewer 201 includes a camera control module 202 for generating instructions for camera control and dealing with notification of the state of the camera 104 and an image display module 203 for controlling the displaying of an image transmitted by the camera server 101. The camera control module 202 communicates with the camera control server 105 and the image display module communicates with the image server 106 of the camera server 101.

The present invention is addressed to, in a case where communication between a client and a camera is undesirably terminated while the client possesses authorization to control the camera (referred to as "authorized client" hereinafter), enabling the client to continue to control the camera under the same camera conditions as at the time of the undesired termination when the client reconnect to the camera server.

The authorization to control the camera (simply referred to as "authorization" hereinafter) is given to a single client at a time. Further, the authorization is valid only for a predetermined period of time, and when the predetermined period is over, the authorization is expired.

Further, the undesired termination of communication indicates a state where it becomes impossible to use a connection which has been established between a camera server and a client, and communication between the camera server and the client is impossible. Therefore, in order to resume communication, it is necessary to restore the communication path between the camera server and the client, then the client has to send a request to establish a new connection to the camera server. Further, a state that communication between the camera server and the client is impossible may include a case where a portable telephone is used as a communication device and the strength of radio wave is weakened to a level with which communication is impossible.

When the client, whose communication with the camera server is undesirably terminated, restores the connection, it is necessary for the camera server to determine whether or not the client was the authorized client at the termination of the communication.

There are several methods for distinguishing the authorized client; in the first embodiment, a method of storing an administration object capable of distinguishing the authorized client in one-to-one correspondence with an internet protocol (IP) address and a user name in the camera control server 105 is used.

The administration object is kept in the camera control server 105 until a predetermined time period (time-out period) has passed after communication is terminated. By using the administration object, it is possible to determine whether a client requesting authorization is the authorized client at the termination of communication, or a different client. The information stored in the administration object includes the IP address, the user name, and logs, such as an elapsed time since the authorization is issued to the client, and the controlled position of the camera.

There are various ways to administrate the authorization after the authorized client restores the connection, as will be described in following embodiments, and an administrator is responsible to select the method used. First, a basic way (policy 1) is explained in the first embodiment.

In the policy 1, if the authorized client whose communication with the camera server was suddenly terminated restores the communication within a given time-out period d, then the authorized client is allowed to continue to control the camera under the same conditions as at the time of the undesired termination of communication. In the policy 1, other clients can not obtain the authorization until the time-out period d elapses.

The aforesaid processing is explained below with reference to FIGS. 3A and 3B. In the operation shown in FIG. 3A, it is assumed that one or more of clients have been connected and communicating with the camera server 101. More specifically, the camera control server 105 reads setting data, receives a request for connection from a client, and certifies the client. In this case, information on the host names and the user names of clients are stored in the setting data in advance, and whether to permit the connection or not is determined on the basis of the information.

In processing of issuing authorization, first in step S301, whether or not any client is registered on a waiting list for the authorization is determined. The waiting list is a list of a client or clients which requested authorization and, when a client requests the authorization, the client is registered at the end of the waiting list.

If there is no client on the waiting list (YES in step S301), the process proceeds to step S302 where the camera control server 105 waits for a request for authorization. When a request for authorization is received from a client, the requested client is added on the waiting list in step S303. Whereas, if there are entries in the waiting list (NO in step S301), then the client at the top of the waiting list is read in step S304.

Then, the process proceeds to step S305, where a predetermined period for which the authorization is valid (referred to as "authorization period" hereinafter) is set. Then, in step S306, an authorization is issued to the client read in step S304. The client which acquired the authorization communicates with the camera server 101 and controls the camera 104 in step S307. In the first embodiment, whether or not the authorization is released, namely, whether or not the authorization period has elapsed or whether or not the communication is undesirably terminated, is checked in step S308, and if the authorization is not released (NO in step S308), then the process proceeds to step S309 where whether or not any other client has requested the authorization is checked. If the authorization has been requested (YES in step S309), then the client requesting authorization is added on the waiting list in step S310 and the process returns to step S307. Whereas, if there is no request (No in step S309), the process directly returns to step S307.

Further, if the authorization is released in step S308, then the process proceeds to step S311 where whether the reason for the release is due to the undesired termination of the communication or not is determined. If not (NO in step S311), the authorization is released since the authorization period has been elapsed, therefore, the process returns to step S301 and the subsequent processes are repeated. Whereas, if the authorization is released because the communication is undesirably terminated (YES in step S311), then the process proceeds to step S312 where reconnection processing is performed.

Next, the reconnection processing performed in step S312 is explained with reference to FIG. 3B.

First, in step S320, an administration object of the disconnected client with authorization (referred to as "authorized client" in the first embodiment) is generated. As described above, the administration object is kept for a predetermined period of time, and after the period has elapsed, it is deleted. Therefore, in step S321, whether or not the predetermined period has passed is determined, and if not (YES in step S321), the process proceeds to step S322 and waits for a request for connection and a request for the administration. If there is no request (NO in step S322), then the process returns to step S321, whereas if a request exists (YES in step S322), the process proceeds to step S323.

A variety of clients may request authorization when requesting connection in step S322, and for every request for connection, the camera control server 105 certifies the client to determine whether or not the client is allowed to be connected. The clients which are allowed to connect are divided into two kinds; one is a client which is newly requesting connection (referred to as "new client" hereinafter), and the other is an authorized client. In step S323, whether or not the request is received from the authorized client is determined. The determination can be performed by checking whether or not an administration object storing an IP address and a user name of the requested client exists in the camera control server 105.

If it is determined in step S323 that the request is not a request for authorization by an authorized client issued along with a request for connection, in other words, the request is either a request for authorization by another client or a request for authorization issued along with a request for connection by a new client (NO in step S323), then the requested client is registered at the end of the waiting list in step S324, and the process returns to step S321. Whereas, if it is determined that the request is a request for authorization issued along with a request for connection by the authorized client (YES in step S323), then the process proceeds to step S325 where the authorized client is determined to be given the authorization, and the process proceeds to step S326.

Further, if it is determined in step S321 that the predetermined period has elapsed (YES in step S321), then the process proceeds to step S326, and the administration object is deleted. Thereafter, if the authorized client requests connection, it is dealt with as a new client.

Figure 3A:
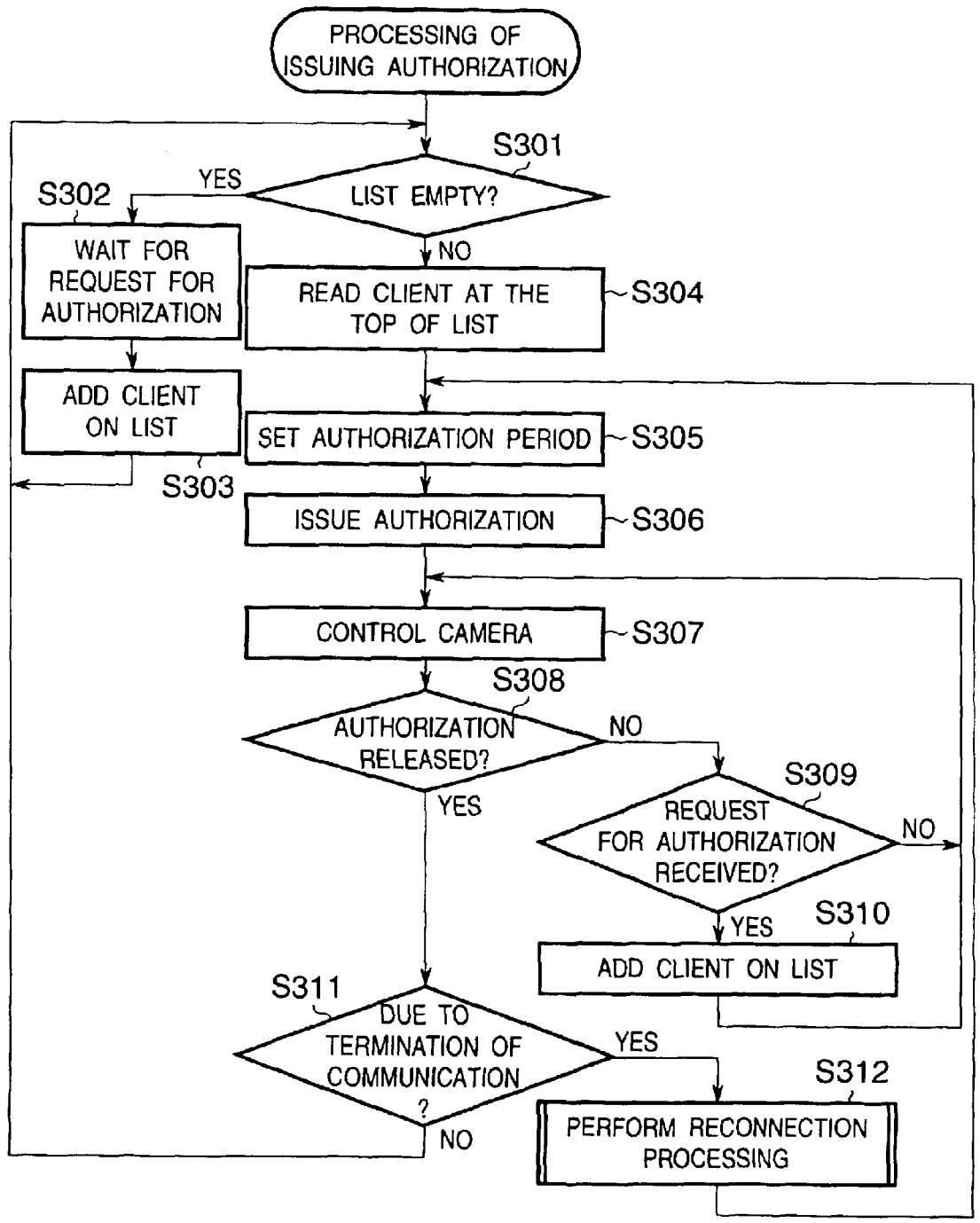
FIGS. 3A and 3B are flowcharts of operation of a camera control server according to a first embodiment of the present invention.
Figure 3B:
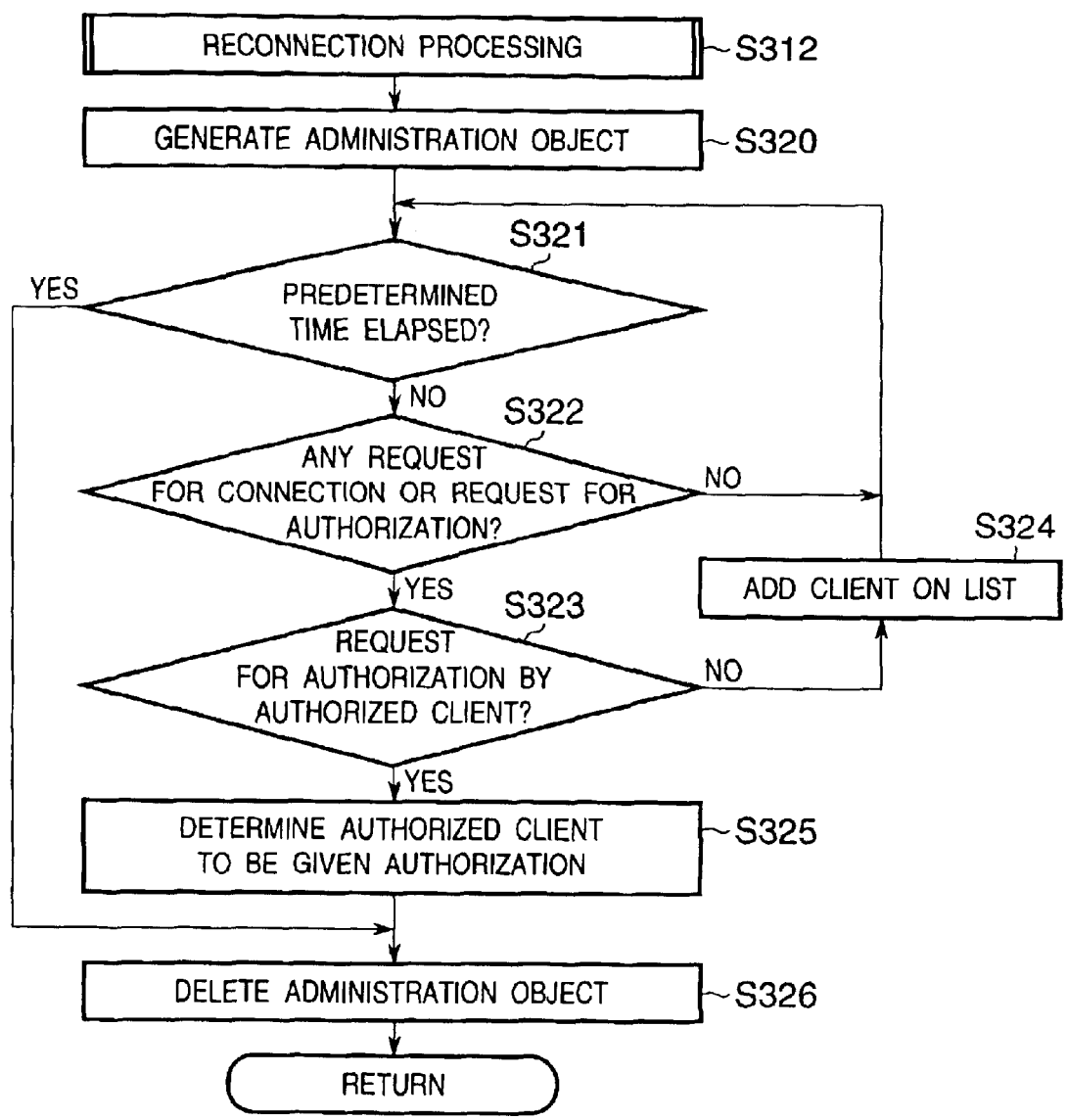

After the client to be given authorization is determined, the process proceeds to step S305 in FIG. 3A and an authorization period is set. In a case of issuing authorization to a new client, a predetermined period T is set as the authorization period. In contrast, in a case of reissuing authorization to the authorized client, if a period t had been already passed by the time of the termination of communication, then an authorization period (T-t) is set. Thereafter, the subsequent steps are repeated.

Note, for the sake of descriptive convenience, only a request for authorization is accepted in steps S302 and S309, however, the present invention is not limited to this, and a request for connection by a new client may be also accepted. In such a case, it is necessary to certify the client which requested connection.

Next, an operation of the image server 106 is explained.

Figure 4A:
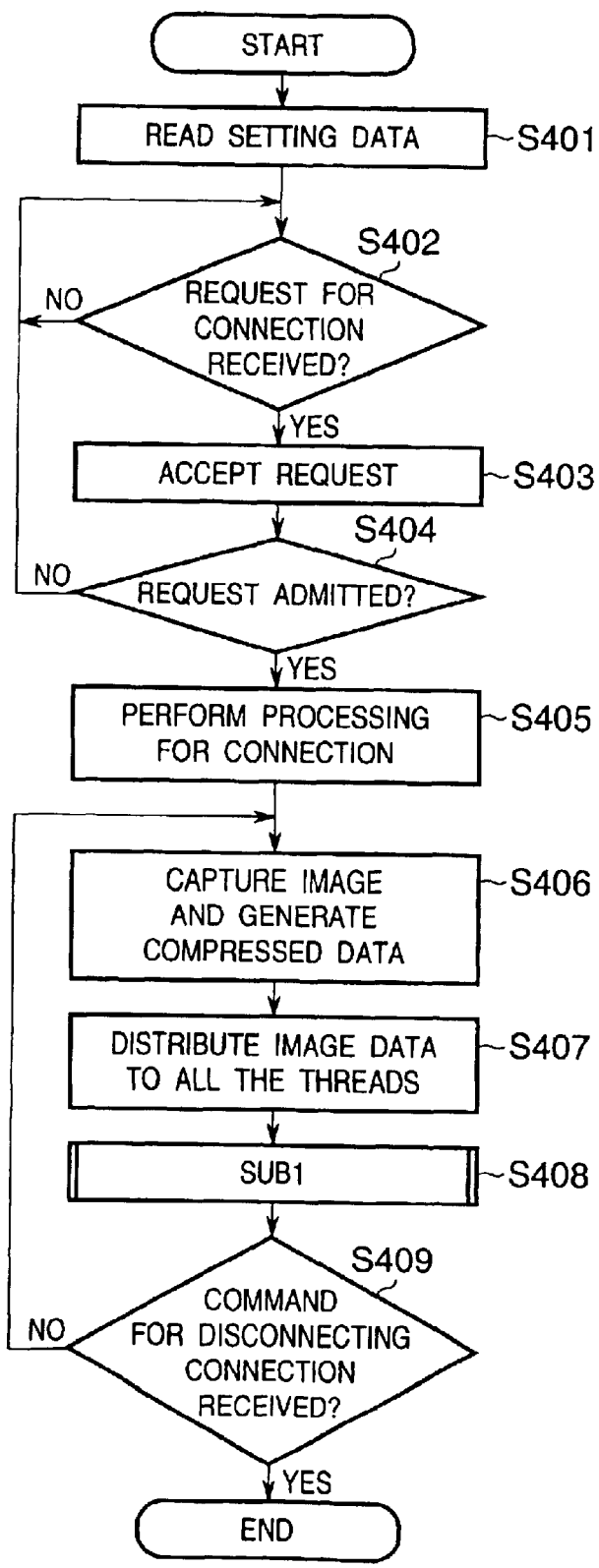
FIGS. 4A and 4B are flowcharts of operation of an image server according to the first embodiment of the present invention.
Figure 4B:
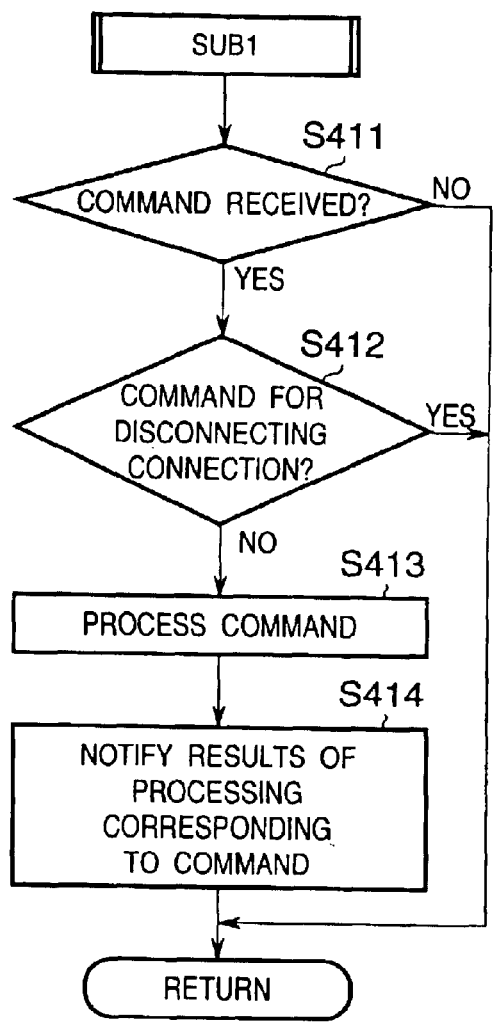

FIGS. 4A and 4B are flowcharts of operation of the image server 106 in the camera server 101. First in step S401, the image server 106 reads image server setting information from a specific file (may be system database, such as registry, in an OS), then initiates the operation. In this step, a thread for capturing and encoding an image is generated (this thread is suspended at first), then in step S402, a port for accepting a request from a viewer program, which is a client, is opened and waits for a request. When a request (a request for connection or a command request) is received, then the process proceeds to step S403 where the image server 106 accepts the request for connection, then in step S404 whether the request for connection is admitted or not is determined. If not, an error code indicative of rejection for connection is transmitted to the client and the process returns to step S402. Whereas, if the request for connection is admitted, then the process proceeds to step S405 where a thread for admitting a command from the client is generated, the client is registered, and, if the thread for capturing and encoding an image is in the suspended state, the thread is activated, then the process proceeds to step S406.

In the generated thread for the client, communication for deciding communication parameters between the viewer program as the client and the image server 106 is performed first, then initiation of the thread for capturing and encoding an image is instructed; in turn, image data is captured using an image capture board at a predetermined interval and converted into compressed data in step S406. Next in step S407, the compressed data is distributed to all the threads for the currently connected clients. When the threads for the respective clients receive request commands for sending an image of the next frame from the corresponding clients (the request commands are generally sent in response to the completion of receiving the compressed image data by the viewer), the threads set flags indicative of the requests for sending the next frame image. After new image data is prepared in step S407, the process proceeds to step S408 (FIG. 4B).

When a command is received in step S411, then the image server 106 accepts it and determines whether or not the received command is a command for disconnecting the connection. If it is (YES in step S412), then the process proceeds to step S409 in FIG. 4A, and the connection is disconnected.

Whereas, if the command is not the command for disconnection (NO in step S412), the process proceeds to step S413 where processing corresponding to the command is performed. If the command received from a viewer in step S411 is a request for sending the next frame image, for instance, then compressed data is transmitted to the viewer. At this time, it is possible to add the current time at the server machine and a message set in the server machine, for instance, to the header of image data. When the thread for a client in the image server 106 receives the command for disconnection, then it informs the existence of the command to a main program, then the thread is deleted. Further, when the received command relates to settings for encoding and transmission, the settings are changed, and the result of the change (a code indicative of success or failure of the operation) is transmitted to the thread which received the command. The thread sends back the result to the corresponding viewer in step S414.

Figure 5:
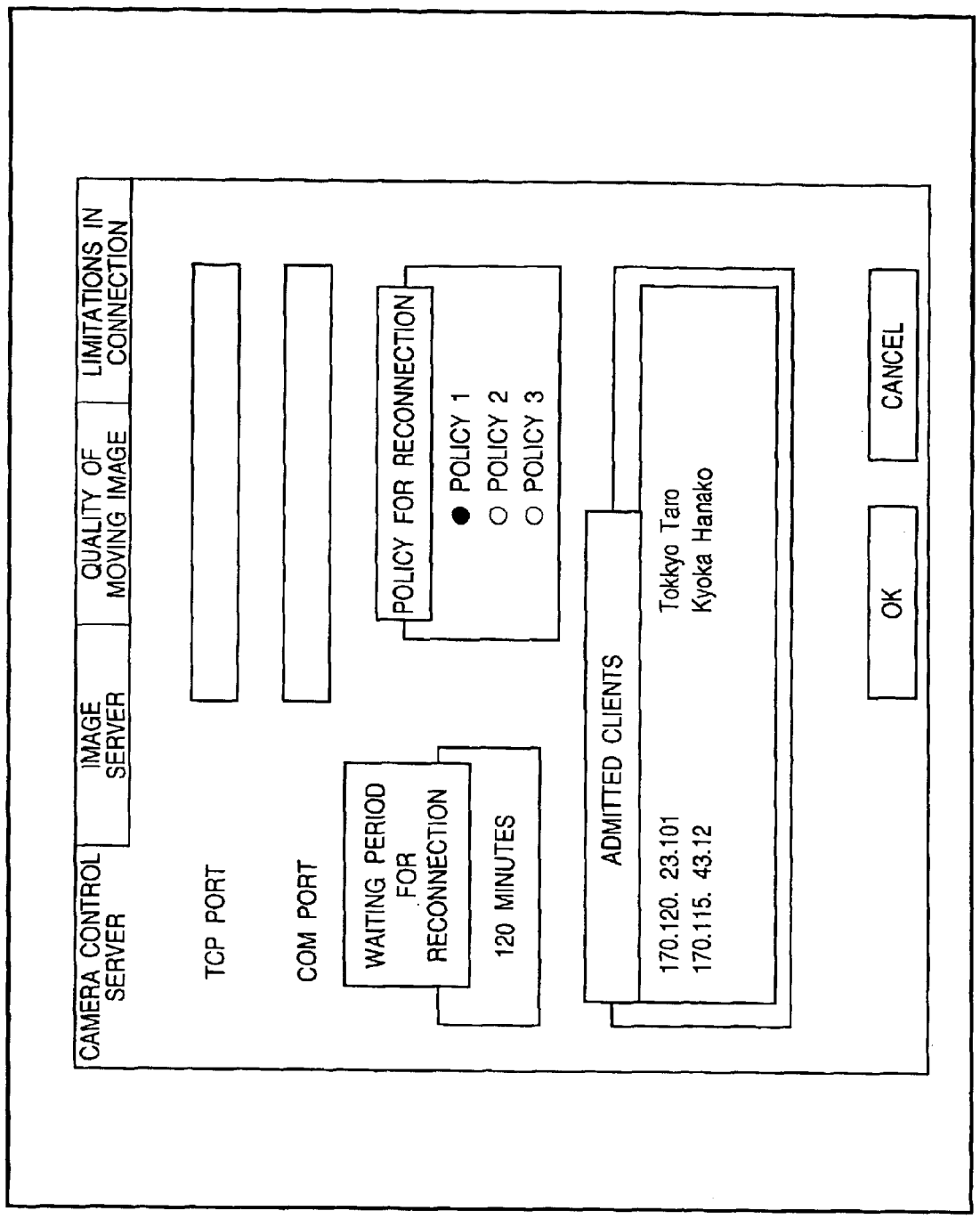
FIG. 5 shows a displayed image of a setting program for a camera server.

FIG. 5 is a displayed image of a setting program for the camera server 101 used for setting values used by the camera server 101, i.e., operation setting information read by the camera control server 105 and the image server 106, to a specific file (may be system database, such as registry, in an OS). Using this image, a variety of parameters (will be explained later) relating to the camera control server 105, the image server 106, quality of a moving image, limitations in connection, for instance, can be set. By pressing the "OK" button, the set value is written in the specific file, or registry, and by pressing the "CANCEL" button, then the set values are ignored and the operation is terminated.

Figure 6:
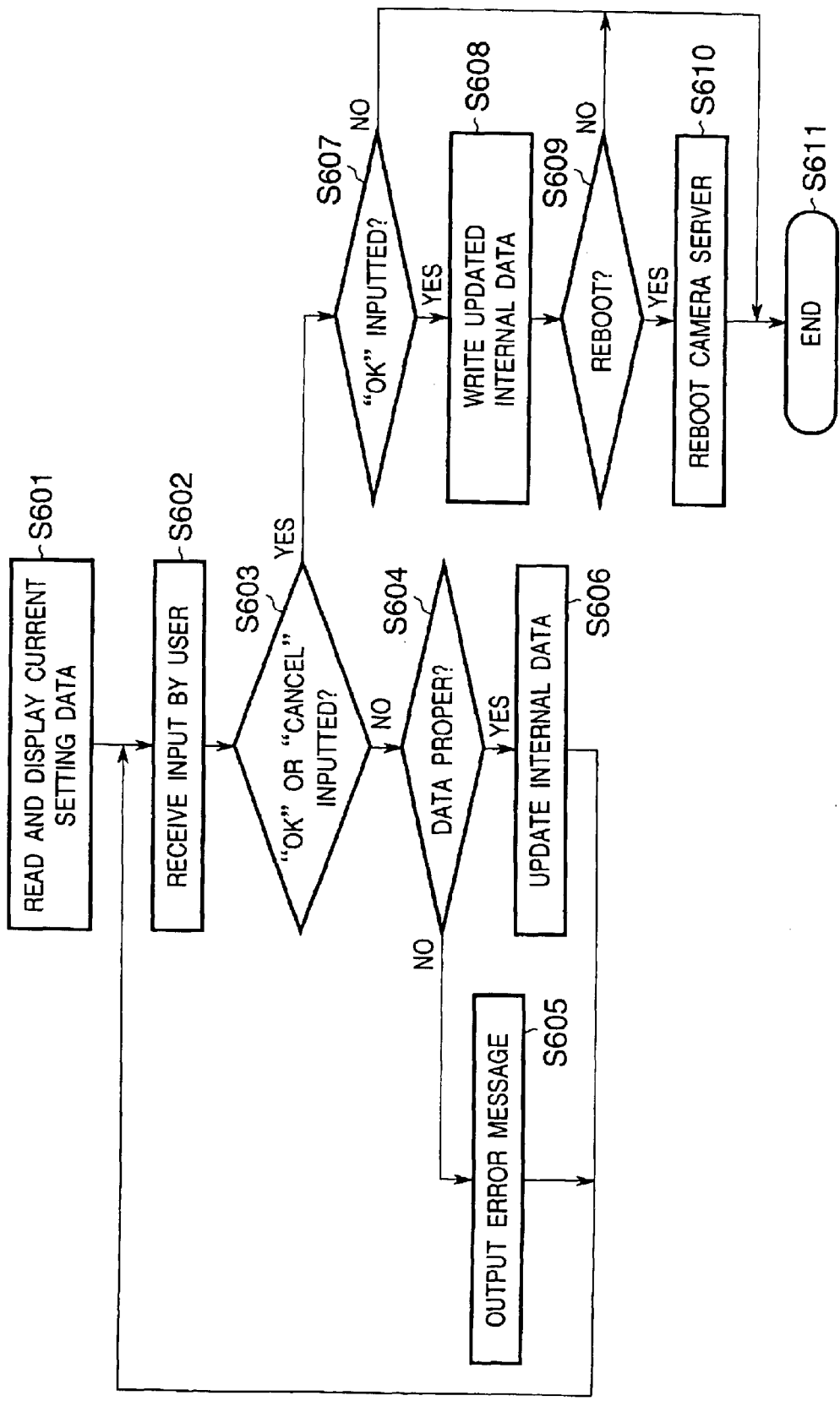
FIG. 6 is a flowchart of operation for setting the camera server.

FIG. 6 is a flowchart of operation of the setting program of the camera server 101 shown in FIG. 5. First in step S601 soon after the program is initiated, the setting program reads setting information from the specific file (system database, such as a registry, in an OS) where setting information on the camera control server 105 and the image server 106 is stored, then set the read information as internal data. Thereafter, the program receives an input operated by a user, and executes processing corresponding to the inputted content. These processes are repeated. More specifically, the program waits the next input by the user in step S602, and if any, accepts the input. In step S603, whether or not the input indicates either "OK" or "CANCEL" is determined. If not, then the process proceeds to step S604 where whether the input value is proper or improper is determined. If the input value is determined as improper (NO in step S604), then an error message is outputted in step S605, an original value is restored, then the process returns to step S602 to wait for the next input by the user. If the input value is determined as proper (YES in step S604), then the internal data is updated in step S606, then the process returns to step S602.

The values which can be set on the displayed image are as follows: the TCP port number for communication for camera control; a COM (serial) port to connect to the camera 104; the maximum waiting period for reconnection (time-out period); a policy for reconnection (policy 1 is described in the first embodiment, policy 2 is described in the second embodiment, and policy 3 is described in the third embodiment. One of the policies 1 to 3 can be selected in the camera server 101); IP addresses and user names of clients to which authorization may be issued; the TCP port number for communication relating images; existence/non-existence of log information and a log file name; a frame rate determining interval to capture images; a Q-factor determining compression quality; a frame size of an original image of the compressed data; the number of entries in the waiting list for the authorization; and the authorization period for which the authorization issued to a viewer is valid.

If the input by the user is "OK" (YES in both steps S603 and 607), then the process proceeds to step S608 where the updated internal data is written to the specific file for storing setting information for the camera control server 105 or the image server 106. Next in step S609, an image asking the user of whether to reboot the camera server 101 for using the updated setting information in the program or not is displayed. For rebooting the camera server 101 (YES in step S609), then camera control server 105 and the image server 106, for instance, are rebooted in step S610, then the setting program is completed in step S611. Whereas for not rebooting, then the process goes to step S611 from step S609, then the program is terminated. Whereas, if the input by the user is "CANCEL" (YES in step S603 and NO in step S607), then the process directly goes to step S611 and the processing is completed.

Figure 7:
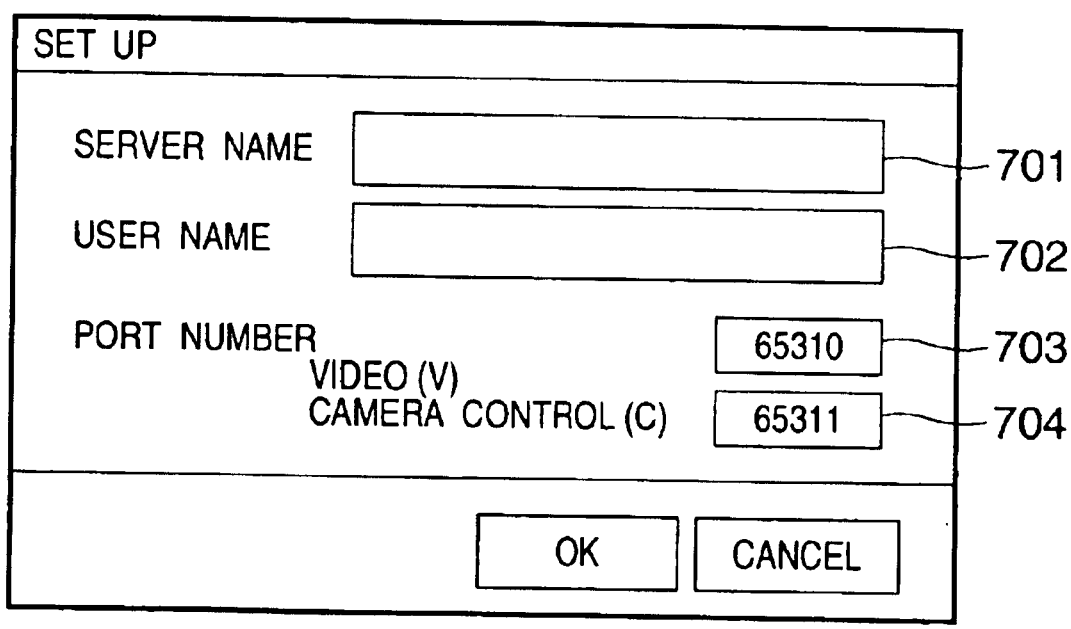
FIG. 7 shows a displayed image of a viewer when connecting to the camera server.

Next, the viewer 201 is explained. FIG. 7 is a displayed image when a client sends a request for connection to the camera server 101. A host to which the camera server 101 belongs is designated in the box 701, and a user name using the viewer 201 is inputted in the box 702. Different port numbers may be designated for the camera control server 105 and the image server 106. By pressing an "OK" button, it is possible to start communicating with the camera server 101.

Figure 8:
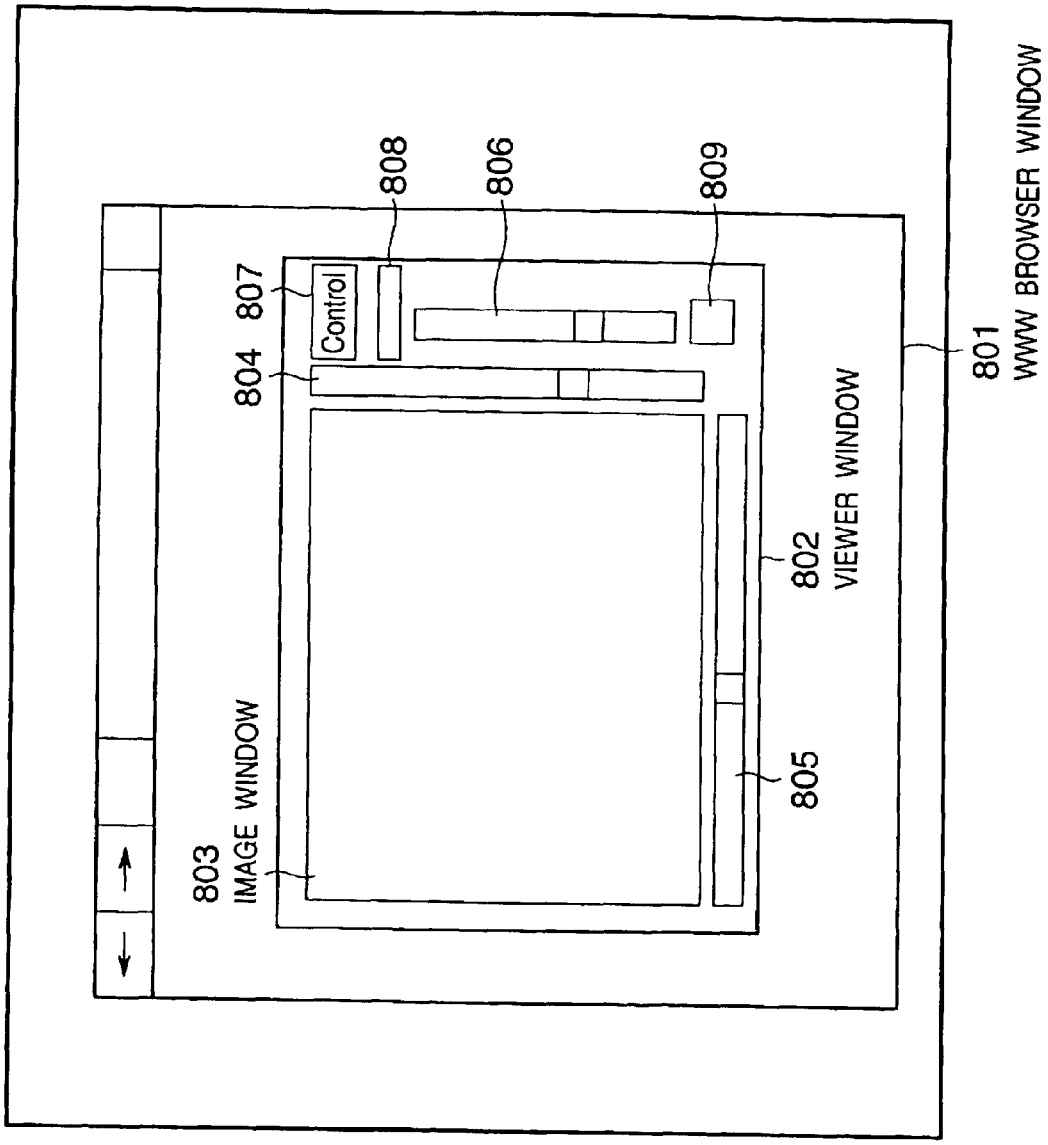
FIG. 8 shows a displayed image of the viewer under operation.

FIG. 8 shows an image on a display of a client host machine on which the viewer 201 is under execution. Reference numeral 801 denotes a window of a World Wide Web (WWW) browser program, and Netscape Navigator available from Netscape Communications Corporation and Internet Explorer available from Microsoft Corporation, for instance, may be used. Reference numeral 802 denotes a viewer program window which operates within the WWW browser program window 801; 803, an image window; 804, a scroll bar for tilting (vertical rotational movement) of the camera; 805, a scroll bar for panning (horizontal rotational movement) of the camera; 806, a scroll bar for zooming operation; 807, a button for requesting authorization; 808, a box where a state of the authorization is displayed; and 809, a button for correcting an image when it is sensed against light.

If communication between the client and the camera server 101 is undesirably terminated while the client holds the authorization, a button for requesting an authorization when the connection is recovered may be added; however, in the first embodiment, the client can automatically regain the authorization if the client reconnects the camera server 101 within the time-out period d.

Figure 9:
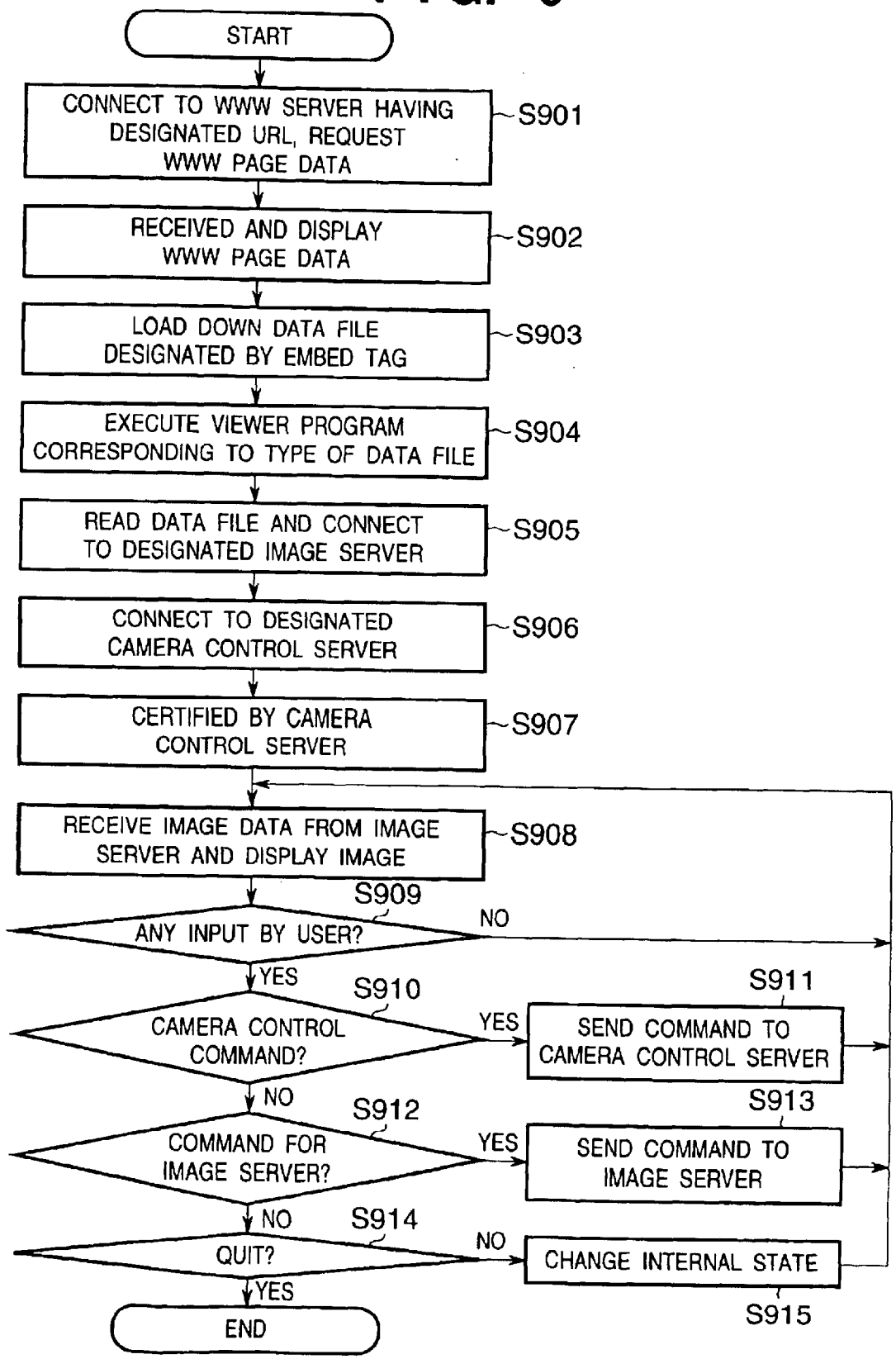
FIG. 9 is a flowchart of operation of the viewer.

FIG. 9 is a flowchart of operation of the viewer 201. In step S901, the WWW browser on the client machine connects to a WWW server having a designated URL address, then requests WWW page data written in the HTML format. Then in step S902, it receives WWW page data from the WWW server, and starts displaying the received WWW page data on the WWW browser. The received WWW page data includes a following embed tag or hyper link indicating information for executing the viewer 201 in the current system and connecting to the camera server 101.

<embed src="camera1.wvp" width=480 height=320>

The WWW browser accesses to the WWW server and loads down a data file designated by the embed tag in step S903, then executes a program corresponding to an identifier of the data file, namely the viewer program in the current system in step S904. The down-loaded data file includes information, such as network addresses and communication ports of the camera control server 105 and the image server 106, necessary for network connection. The viewer program reads the data file loaded down in step S905, and connects to the image server 106 of the image server 101 in accordance with the information on the image server address and the connection port written in the data file. Thereafter, an operation program (in current method, a thread or processes) for controlling processing after the connection is executed, and parameters relating to communication are interchanged with the image server 106.

In step S906, the viewer 201 connects to the camera control server 105 in accordance with the information on the address and connection port of the camera control server 105 written in the down-loaded data file, then in step S907, the viewer 201 is certified for controlling the camera, and interchanges parameters relating to communication with the camera control server 105.

Next in step S908, the viewer 201 receives image data from the image server and displays it.

Thereafter, the main program accepts an operation request from the user, and executes it. First, in step S909, it receives an input by the user on the graphic user interface (GUI) of the window 801 shown in FIG. 8 designated by using a mouse or a keyboard. If the input by the user is relating to camera control (YES in step S910), then a command is outputted to the camera control server 105 in step S911, and if the input by the user is relating to the image server 106 (YES in step S912), then a command is outputted to the image server 106 in step S913. Further, if the input by the user is for changing a state (e.g., size of the displayed window) of the viewer 201 (NO in step S914), then the internal state is updated, and the size of the displayed image, for instance, is changed using functions provided from the OS of the computer and a window system. When the input by the user indicates to quit the operation (YES in step S914), then programs relating to the operation of the viewer 201 are sequentially terminated. After processes in steps S911, S913 and S915 are completed, the process returns to step S908, an image is updated, then another input by the user is checked.

It should be noted that, when it is determined in step S910 that the input by the user is a camera control command, the input command is effective only during a period when the authorization is given to the client by the camera server 101. Thus, if the camera control command is inputted when the viewer 201 does not have the authorization, the command may be ignored in the viewer 201, or in the camera server 101 after the camera server 101 receives the camera control command from a client which does not have the authorization. Further, it is possible to configure the apparatus so as to inform the user that the client does not have authorization.

Figure 10:
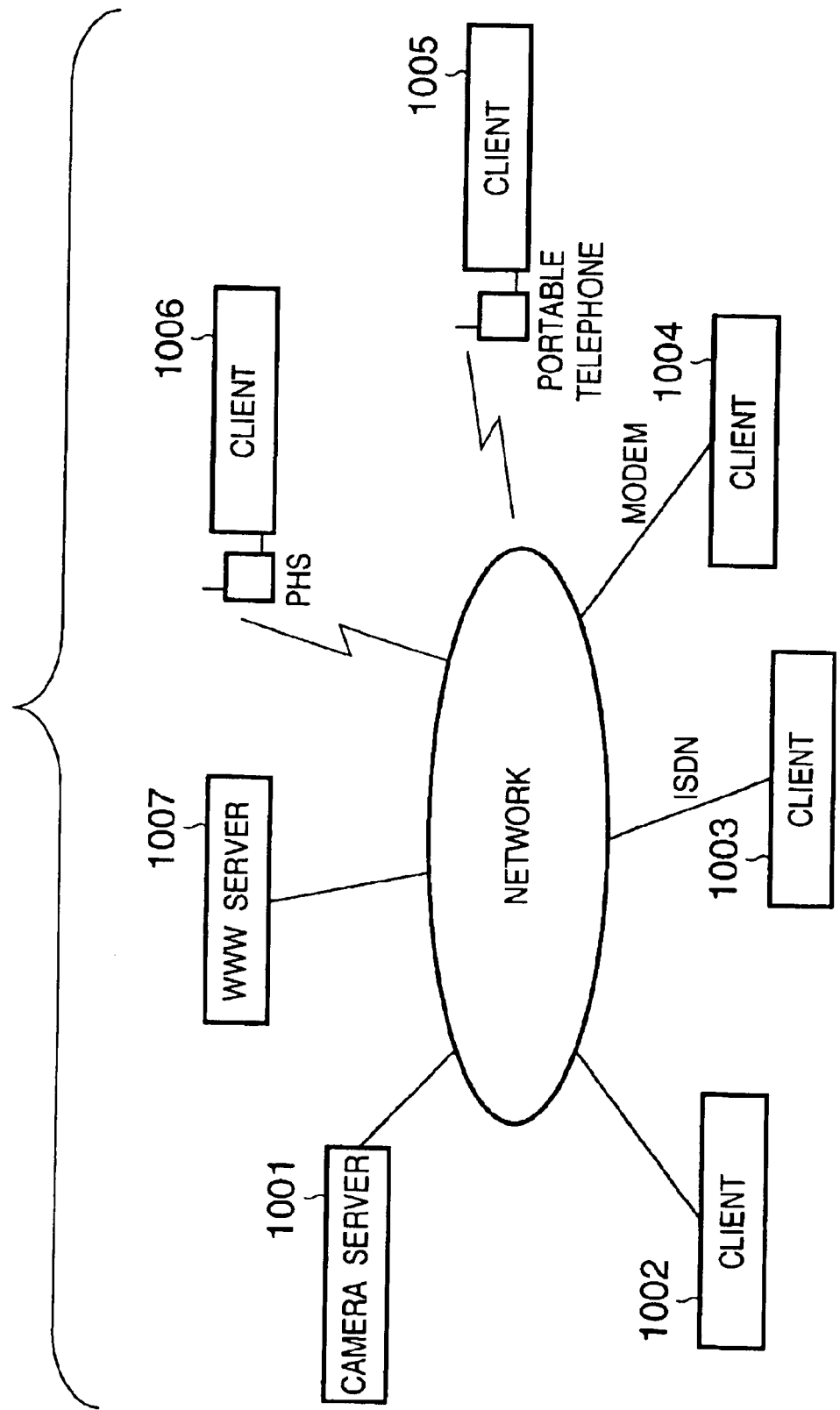
FIG. 10 is a general utilization style of the present invention.

FIG. 10 is a view showing a situation in which the camera server 101 and the viewer 201 according to the present invention may be used. In FIG. 10, reference numeral 101 denotes the camera server of the present invention and reference numerals 1002 to 1006 denote clients, each corresponds to the client 102 described above. The clients 1002 to 1006 can access to the camera server 101 via a WWW server 1007. By accessing a camera server via the WWW server 1007, a plurality of clients can easily access the desired camera servers.

In the network shown in FIG. 10, the camera server 101 and the client 1002 are directly connected to the Internet, the clients 1005 and 1006 are connected to the Internet via portable telephones, the client 1003 is connected to the Internet via Integrated Services Digital Network (ISDN), and the client 1004 is connected to the Internet via a modem. There is a possibility that connection between the camera server 101 and any one of these clients 1002 to 1006 is disrupted somewhere within and outside of the network. Especially, communication via radio wave using a portable telephone is easily terminated due to strength of the radio wave. The system as shown in FIG. 10 is not special, and very common.

Next, a general hardware configuration of the computer 103 in the camera server 101 according to the first embodiment is shown in FIG. 11.

The computer 103 includes ROM 301, RAM 302, a central processing unit (CPU) 303, a disk device 304; a bus 305, an input/output (I/O) port 306, an interface (I/F) 307, and an external storage device 308. The ROM 301 stores a program for realizing the control sequence shown in FIGS. 3A and 3B. The RAM 302 provides a work area necessary for executing the program. The CPU 303 performs processes in accordance with the program stored in the ROM 301. The bus 305 connects the respective configuration elements to realize transmission/reception of data between the elements. The I/O port 306 is for communicating with the camera. The I/F 307 connects to an input unit 309, such as a mouse and a keyboard. Further, the external storage device 308 is for driving an external storage medium, such as a floppy disk and a CD-ROM. When the control program is stored in the external storage medium instead of the ROM 301, the external storage device 308 reads and loads down the program to the computer 103.

According to the first embodiment as described above, if the communication between a client and a camera server is undesirably terminated while the client holds the authorization to control a camera, by restoring the connection within a predetermined period, it is possible for the client to continuously control the camera under the same conditions as at the time of the undesired termination.

<Second Embodiment>

In the first embodiment, if communication between the camera server 101 and an authorized client is undesirably terminated, other clients can not acquire authorization until the authorized client restores the connection and the rest of the authorization period has passed or a predetermined period (time-out period) elapses after the termination. In the second embodiment, another client is allowed to gain the authorization while waiting for the terminated client to restore the connection to the camera server 101 (policy 2). However, the terminated client is given priority to acquire the authorization over other clients.

According to the policy 2, the client newly gained the authorization after the termination can continue operating the camera, and after the authorization period is over, the terminated client is given the authorization prior to the other clients on the waiting list. When the terminated client regains the authorization, the camera conditions are recovered to the conditions at the time of the undesired termination, thus the terminated client can start control the camera with the recovered conditions.

Figure 12A:
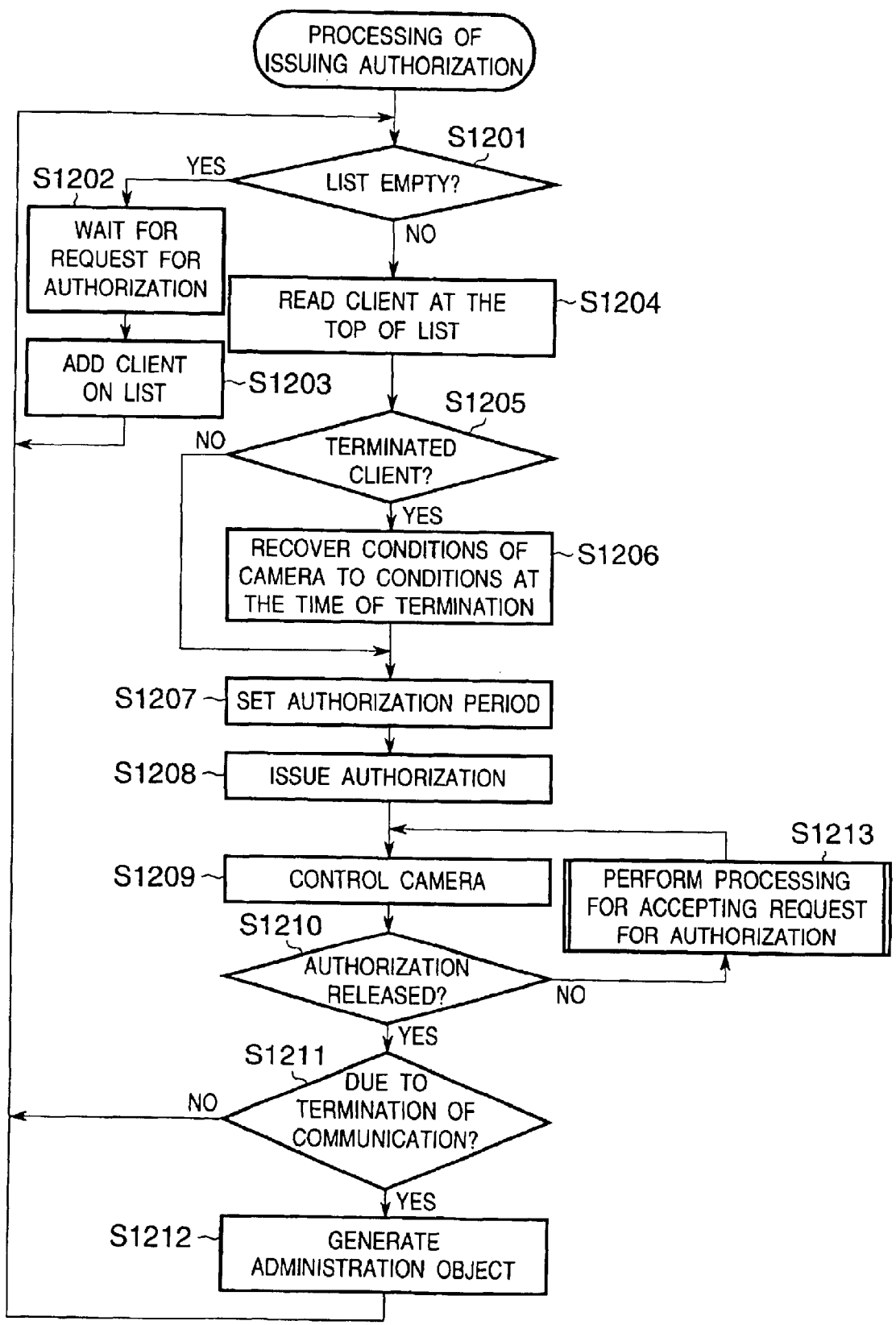
FIGS. 12A and 12B are flowcharts of operation of a camera control server according to a second embodiment of the present invention.
Figure 12B:
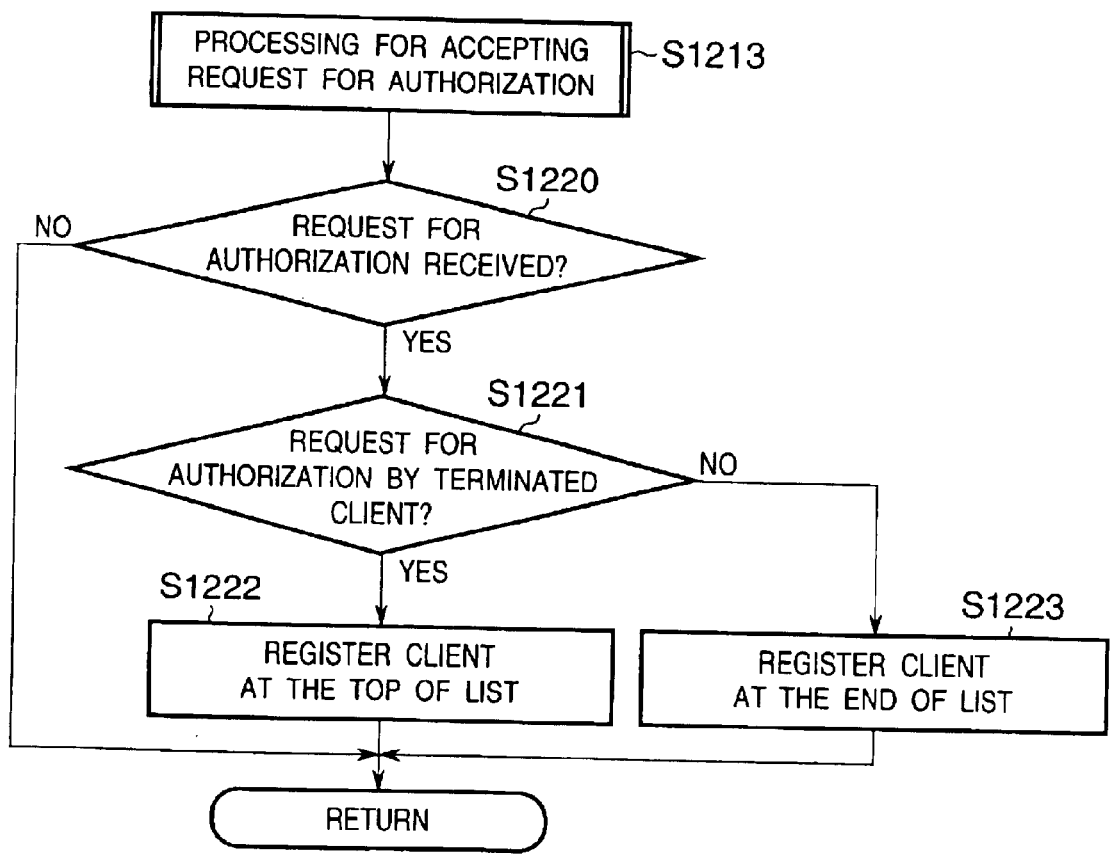

FIGS. 12A and 12B show a processing sequence of the camera control server 105 according to the second embodiment.

In the operation shown in FIG. 12A, it is assumed that one or more clients have been already connected and communicating with the camera server 101. More specifically, the camera control server 105 reads setting data and initiates the program, receives a request for connection from a client, and certifies the client. In this case, the read setting data includes information on the host names and the user names of clients, and whether to permit the connection or not is determined on the basis of the information.

In processing of issuing the authorization, first in step S1201, whether or not any client is registered on the waiting list for the authorization is determined. The process to register a client on the waiting list is different from the first embodiment, and it will be explained later.

If there is no entry in the waiting list (YES in step S1201), then the process proceeds to step S1202 where the camera control server 105 waits for a request for authorization. When a request for authorization is received from a client, the client requested the authorization is registered at the end of the waiting list. Whereas, if there is any entry in the waiting list (NO in step S1201), then the client at the top of the waiting list is read in step S1204.

Thereafter, the process proceeds to step S1205, and whether or not the client read from the top of the waiting list is the terminated client is determined. The determination can be performed by checking whether or not an administration object storing an IP address and a user name of the requested client exists in the camera control server 105. If it is determined that the client at the top of the waiting list is the terminated client (YES in step S1205), then the camera conditions are returned to the conditions at the time of the undesired termination on the basis of information stored in the administration object in step S1206, then the process proceeds to step S1207. Further, if NO in step S1205, the process also proceeds to step S1207.

In step S1207, an authorization period is set. In a case of issuing authorization to a new client, a predetermined period T is set as the authorization period. In contrast, in a case of reissuing authorization to the terminated client, if a period t had been already passed by the time of the termination, then an authorization period T-t is set. In step S1208, the authorization is issued to the client read at step S1204. The client which attained the authorization communicates with the camera server 101 and controls the camera (step S1209). Then, whether or not the authorization is released, namely, whether or not the predetermined authorization period has passed or whether or not the connection is undesirably terminated, is checked at a predetermined interval in step S1210, and if the authorization is released (YES in step S1210), the process proceeds to step S1211 where whether or not the reason for the release of the authorization is due to the undesired termination of communication is determined. If not (NO in step S1211), the authorization is released since the authorization period has been elapsed, therefore, the process returns to step S1201 and its subsequent processes are repeated. Whereas, if the authorization is released because of the undesired termination of communication (YES in step S1211), then the process proceeds to step S1212 where the administration object is generated, then the process returns to step S1201. The generated administration object is designed to be deleted after a predetermined period.

Further, if it is determined that the authorization is not released in step S1210, the process proceeds to step S1213 where a request for authorization is accepted.

Next, processing for accepting a request for authorization which is performed in step S1213 is explained with reference to FIG. 12B.

First in step S1220, whether or not a request for authorization is received is determined. Note, the request for the authorization may be issued by itself or may be automatically issued along with the request for connection. If there is no request (NO in step S1220), the process returns to step S1209 in FIG. 12A and the control of the camera is continued; whereas if there is any request (YES in step S1220), then the process proceeds to step S1221.

A variety of clients may request authorization when requesting connection in step S1221, and for every request for connection, the camera control server 105 certifies the client to determine whether or not the client is allowed to be connected. The clients allowed to connect are one of the two kinds; one is a new client, and the other is the terminated client. In step S1221, whether or not the request is received from the terminated client is determined. The determination can be performed by referring to the administration object, thus, after the predetermined period d has passed and the administration is deleted, the terminated client is dealt as a new client.

If it is determined in step S1221 that the request is not a request for authorization by the reconnecting client issued along with a request for connection, in other words, the request is either a request for authorization by another client or a request for authorization issued along with a request for connection by a new client (NO in step S1221), then the requested client is registered at the end of the waiting list, and the process returns to step S1209 in FIG. 12A. Whereas, if it is determined in step S1221 that the request is a request for authorization issued along with a request for connection by the terminated client (YES in step S1221), then the terminated client is registered at the top of the waiting list. Thus, in the second embodiment, different from the first embodiment, another client is allowed to gain the authorization after the communication between the camera server 101 and the authorized client is terminated, the terminated client can not always regain the authorization soon after the communication is restored. However, by registering the terminated client at the top of the waiting list, the authorization is given to the terminated client prior to other clients on the waiting list. Thereafter, the process returns to step S1209 in FIG. 12A.

It should be noted that, for the sake of descriptive convenience, only a request for authorization is accepted in step S1202, however, a request for connection by a new client may be also accepted. In such a case, it is necessary to certify the client requested connection.

As for a certification method when a request for connection is received in the first embodiment, the IP address and the user name of the client are used to identify the client. Other than this method, a method of identifying the client using a key and a password administrated by the image server 106 may be used. The client should acquire the key before using the image distribution system, and the key should be registered in relation to a password in the camera control server 105. Then, the client needs to input the key and the password when accessing the camera server 101. Therefore, in a displayed image for requesting connection to the camera server as shown in FIG. 7, boxes for inputting a password and a key are needed. By using this key, it is possible for the camera control server 105 to identify the administration object.

In the first embodiment, a terminated viewer can instantly gain the authorization to control the camera after restoring connection. Whereas, in the second embodiment, the terminated viewer may have to wait to gain the authorization after the connection is restored. Thus, information indicating how long the terminated viewer has to wait before the authorization is issued to the viewer may be provided to the viewer. A display function for displaying such information may be easily added to the GUI shown in FIG. 8.

According to the second embodiment as described above, if the communication between a camera server and an authorized client is undesirably terminated, by restoring the connection within a predetermined period, the terminated client is given priority to regain the authorization over other clients and can control the camera under the same conditions as at the time of the undesired termination.

<Third embodiment>

In the second embodiment, if another client is given the authorization when the terminated client with authorization restored the connection, the terminated client has to wait until the authorization is released by the other client. In contrast, in the third embodiment, the authorization issued to the other client is suspended, and the terminated client is given the authorization soon after the connection is restored (policy 3). For realizing this operation, a priority order of clients is determined on the basis of some criteria. In the third embodiment, the priority order is determined based on the time when the clients started controlling a camera.

In this case, if another client is controlling the camera when the terminated client restores the connection, and if the time when the terminated client started controlling the camera is earlier than the time when the other client started controlling the camera, then the terminated client can regain the authorization. If the client which is controlling the camera when the terminated client restores the connection is also a terminated client and the time when this client started controlling the camera is earlier than the time when the reconnected client started controlling the camera, the client controlling the camera is given priority over the reconnected client, and the reconnected client is put on the waiting list. Further, a client which newly requests for authorization is given the lowest priority.

Further, if there is a system for charging clients for authorization in an administration unit, the criterion of the priority order may be determined on the basis of the amounts of money which clients must pay. In this case, charges per minute may be varied and a client paying a higher charge may receive better services, such as a higher priority, a longer authorization period, and/or a higher zoom ratio.

Many other charging systems can be considered and any kind may be adopted in the third embodiment as long as clients are ranked in the charging system and the rank can be used for determining the priority order.

Figure 13A:
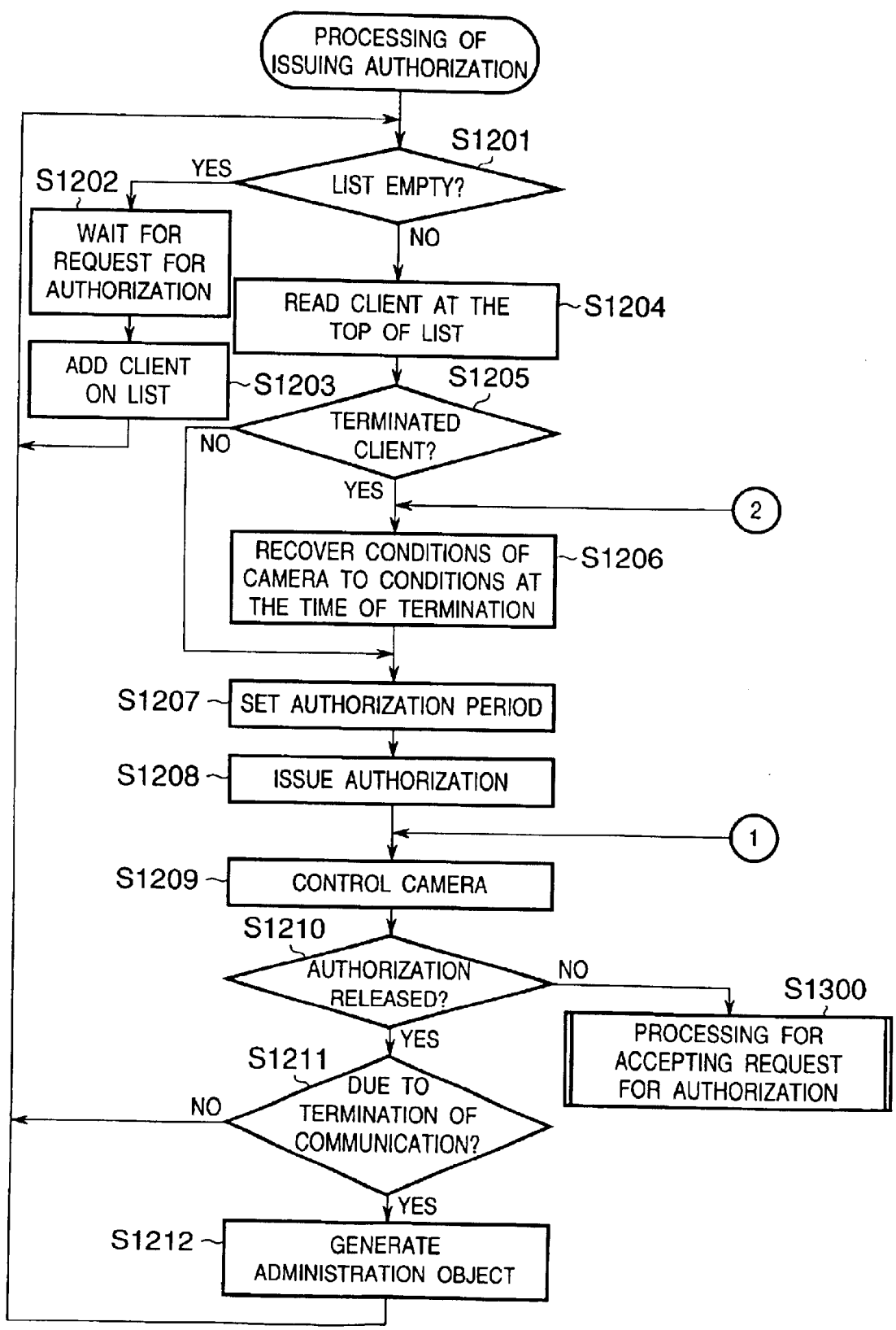
FIGS. 13A and 13B are flowcharts of operation of a camera control server according to a third embodiment of the present invention.
Figure 13B:
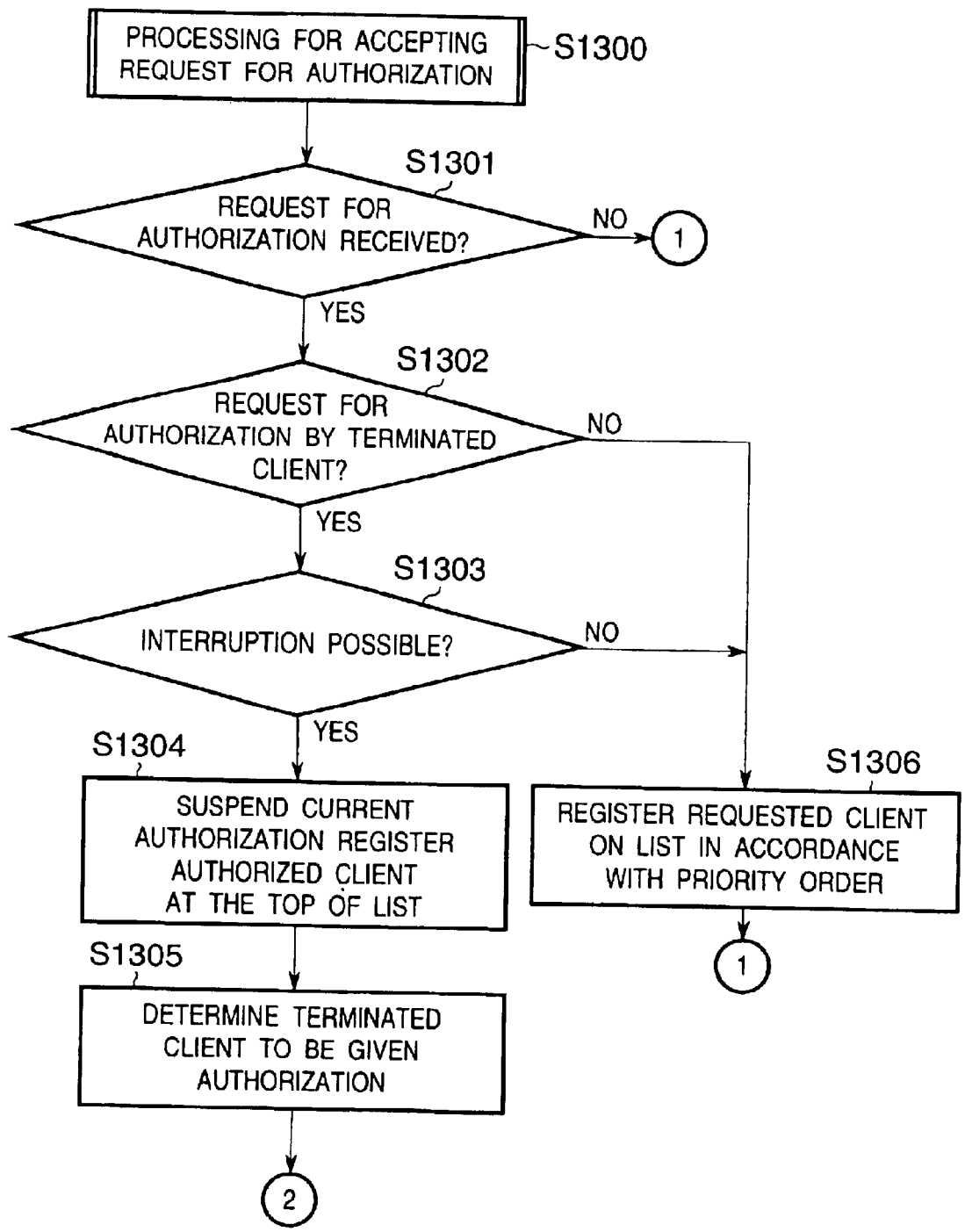

FIGS. 13A and 13B are flowcharts of a processing sequence of the camera control server 105 according to the third embodiment.

In FIG. 13A, the similar processes as those in FIG. 12A are referred to by the same step numbers, and explanation of those processes is omitted, and processes different from those in FIG. 12A are explained below.

When it is determined in step S1210 that the authorization is not released, then, in step S1300, a request for authorization is accepted. This processing is different from the processing of step S1213 in FIG. 12A explained in the second embodiment. The processing in step S1300 is explained with reference to FIG. 13B.

In step S1301, whether or not a request for authorization is received is determined. Note, the request for the authorization may be issued by itself or may be automatically issued along with the request for connection. If there is no request (NO in step S1301), the process returns to step S1209 in FIG. 13A and the control of the camera is continued; whereas if there is a request (YES in step S1301), then the process proceeds to step S1302.

In step S1302, whether or not the request is from a terminated client is determined. The determination can be performed by referring to the administration object, thus, after the predetermined period d has passed and the administration is deleted, the terminated client is dealt with as a new client.

If it is determined in step S1302 that the requested client is a terminated client, then the process proceeds to step S1303 where whether or not it is possible to interrupt the authorization given to another client currently controlling the camera is determined on the basis of the criterion. If it is determined that the interruption is possible (YES in step S1303), then the process moves on to step S1304, the authorization which has been given to the other client is suspended, and the other client is added on the waiting list on the basis of the criterion. In step S1305, the terminated client is determined to be given the authorization, then the process returns to step S1206 in FIG. 13A. Whereas, if the requested client is not a terminated client (NO in step S1302) or it is determined that the interruption is not possible (NO in step S1303), the process proceeds to step S1306 and the client is added on the waiting list on the basis of a priority criterion. In registering the client on the waiting list, the client is added at the position before a client which is given a lower priority and after a client which is given a higher priority. Thereafter, the process returns to step S1209 in FIG. 13A.

It should be noted that, if it is possible to give the authorization to the terminated client (i.e., interruption is possible) in step S1303, it is necessary to notify the client machine currently holding the authorization of the interruption. The interrupted client machine notifies the user of the interruption. In this case, a display function for indicating the interruption is added to the image shown in FIG. 8 in the viewer.

In this case, the administration object stores an elapsed time of the authorization period until the client is interrupted, and when the authorization is reissued to the interrupted client later, it is valid for the rest of the authorization period.

Further, in the third embodiment, when the terminated client has a higher priority order to the current authorized client, the authorization issued to the client is interrupted; however, the terminated client may be given authorization after the authorization currently issued is released. In this case, every client which requested the authorization in step S1301 in FIG. 13B is registered in the waiting list in accordance with the criterion.

Further, in the first and second embodiments, the camera server sets a predetermined period T for a client which newly attained an authorization as an authorization period, and sets a period T-t for a terminated client when the communication is terminated after a period t has elapsed. However, the present invention is not limited to above, and the camera server may set a predetermined period T for a new client while set a period T-t-s for a terminated client when the communication is terminated after a period t has elapsed, and a period s has elapsed before the connection is restored.

The aforesaid ways for assigning period allowed an authorized client to hold the authorization contain problems if a client is charged for a period of holding the authorization. In the first and second embodiments, the disconnected period after the communication is undesirably terminated is not charged. However, in the third embodiment, the disconnected period is charged. Thus, when charging a user for controlling the camera, the camera control protocol should take the termination of the communication into consideration.

According to the third embodiment as described above, if the communication between a camera server and an authorized client is undesirably terminated, by restoring the connection within a predetermined period, the terminated client is given priority to regain the authorization and can control the camera under the same conditions as at the time of the undesired termination.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

What is claimed is:

1. An image distribution system comprising:
   an image sensing apparatus controllable by an external device;
   an image transmission apparatus having a function of digitizing and transmitting an image signal acquired by said image sensing apparatus via a network and a function of issuing authorization to control said image sensing apparatus;
   an image reception apparatus which receives and displays the transmitted digitized image signal, further requests to control said image sensing apparatus; and
   a network connecting said image transmission apparatus and said image reception apparatus,
   wherein, in a case where said image transmission apparatus issues the authorization to said image reception apparatus to control said image sensing apparatus and communication between said image reception apparatus and said image transmission apparatus is undesirably terminated while said image reception apparatus holds the authorization, after restoring the communication within a predetermined period, conditions of said image sensing apparatus are restored to conditions at the time of the undesired termination, and said image reception apparatus is allowed to continuously control said image sensing apparatus under the restored conditions.

2. The image distribution system according to claim 1, wherein at least one of panning operation, tilting operation, and zooming operation of said image sensing apparatus is controlled by said image reception apparatus.

3. The image distribution system according to claim 1, wherein said image transmission apparatus comprises certification means for identifying whether or not said image reception apparatus is allowed to control said image sensing apparatus.

4. The image distribution system according to claim 1, wherein said image transmission apparatus immediately issues the authorization to control said image sensing apparatus to said image reception apparatus when said image reception apparatus restores the communication within the predetermined period after the undesired termination of the communication.

5. The image distribution system according to claim 1, wherein, in a case where said image reception apparatus restores the communication within the predetermined period after the undesired termination and another image reception apparatus holds authorization to control said image sensing apparatus at the time of the restoration of the communication, said image transmission apparatus gives priority to said restored image reception apparatus to receive the authorization to control said image sensing apparatus after the other image reception apparatus releases the authorization to control said image sensing apparatus.

6. The image distribution system according to claim 5, wherein said image transmission apparatus informs said restored image reception apparatus of time to take until said image transmission apparatus issues the authorization to control said image sensing apparatus to said restored image reception apparatus, and said image reception apparatus has a function of indicating the notified time.

7. The image distribution system according to claim 1, said image transmission apparatus comprises administration means for, when a request for authorization to control said image sensing apparatus is received after the undesired termination, determining whether or not an image reception apparatus which requested the authorization is said image reception apparatus whose communication was undesirably terminated while holding an authorization.

8. The image distribution system according to claim 7, wherein said administration means performs the determination on the basis of an IP (internet protocol) address and a user name of the image reception apparatus which requested the authorization.

9. The image distribution system according to claim 7, wherein said administration means performs the determination on the basis of a key issued by said image transmission apparatus and a password.

10. An image distribution system comprising:
    an image sensing apparatus controllable by an external device;
    an image transmission apparatus having a function of digitizing and transmitting an image signal acquired by said image sensing apparatus via a network and a function of issuing authorization to control said image sensing apparatus;
    an image reception apparatus which receives and displays the transmitted digitized image signal, further requests to control said image sensing apparatus; and
    a network connecting said image transmission apparatus and said image reception apparatus,
    wherein, in a case where said image transmission apparatus issues the authorization to said image reception apparatus to control said image sensing apparatus and communication between said image reception apparatus and said image transmission apparatus is undesirably terminated while said image reception apparatus holds the authorization, after restoring the communication within a predetermined period, conditions of said image sensing apparatus are restored to conditions at the time of the undesired termination, and said image reception apparatus is allowed to continuously control said image sensing apparatus under the restored conditions,
    wherein, in a case where said image reception apparatus restores the communication within the predetermined period after the undesired termination and another image reception apparatus holds authorization to control said image sensing apparatus at the time of the restoration of the communication, said image transmission apparatus suspends the authorization issued to the other image reception apparatus and issues authorization to control said image sensing apparatus to said restored image reception apparatus.

11. The image distribution system according to claim 10, wherein, in a case where said image reception apparatus restores the communication within the predetermined period after the undesired termination, said image transmission apparatus issues the authorization to control said image sensing apparatus after restoring conditions of said image sensing apparatus to the conditions at the time of the undesired termination.

12. The image distribution system according to claim 10, wherein said image transmission apparatus issues the authorization to control said image sensing apparatus to said restored image sensing apparatus after suspending the authorization issued to the other image sensing apparatus if said restored image reception apparatus has higher priority than the other image reception apparatus.

13. The image distribution system according to claim 12, wherein said priority is determined on the basis of time when the image reception apparatuses start controlling said image sensing apparatus.

14. The image distribution system according to claim 12, wherein, when the image distribution system charges an image reception apparatus for the authorization to control said image sensing apparatus, said priority is determined on the basis of ranks given to the image reception apparatuses in a charging system.

15. An image distribution system comprising:
an image sensing apparatus controllable by an external device;
an image transmission apparatus having a function of digitizing and transmitting an image signal acquired by said image sensing apparatus via a network and a function of issuing authorization to control said image sensing apparatus;
an image reception apparatus which receives and displays the transmitted digitized image signal, further requests to control said image sensing apparatus; and
a network connecting said image transmission apparatus and said image reception apparatus,
wherein, in a case where said image transmission apparatus issues the authorization to said image reception apparatus to control said image sensing apparatus and communication between said image reception apparatus and said image transmission apparatus is undesirably terminated while said image reception apparatus holds the authorization, after restoring the communication within a predetermined period, conditions of said image sensing apparatus are restored to conditions at the time of the undesired termination, and said image reception apparatus is allowed to continuously control said image sensing apparatus under the restored conditions,
wherein said image transmission apparatus issues the authorization to control said image sensing apparatus after restoring the conditions of said image sensing apparatus.

16. An image distribution system comprising:
an image sensing apparatus controllable by an external device;
an image transmission apparatus having a function of digitizing and transmitting an image signal acquired by said image sensing apparatus via a network and a function of issuing authorization to control said image sensing apparatus;
an image reception apparatus which receives and displays the transmitted digitized image signal, further requests to control said image sensing apparatus; and
a network connecting said image transmission apparatus and said image reception apparatus,
wherein, in a case where said image transmission apparatus issues the authorization to said image reception apparatus to control said image sensing apparatus and communication between said image reception apparatus and said image transmission apparatus is undesirably terminated while said image reception apparatus holds the authorization, after restoring the communication within a predetermined period, conditions of said image sensing apparatus are restored to conditions at the time of the undesired termination, and said image reception apparatus is allowed to continuously control said image sensing apparatus under the restored conditions,
wherein said image transmission apparatus comprises authorization period administration means for setting a period allowed for said image reception apparatus to hold the authorization at the time of restoration of communication after the undesired termination.

17. The image distribution system according to claim 16, wherein said authorization period administration means sets a period T-t for said image reception apparatus at the time of restoration of communication, where T indicates a period which is allowed for an image reception apparatus to hold authorization and t indicates a period elapsed by the time of the termination.

18. The image distribution system according to claim 16, wherein said authorization period administration means sets a period T-t-s for said image reception apparatus at the time of restoration of communication, where T indicates a period which is allowed for an image reception apparatus to hold authorization, t indicates a period elapsed by the time of the termination, and s indicates a period elapsed since the termination of the communication until the restoration of the communication.

19. A control method for controlling an image distribution system having an image sensing apparatus controllable by an external device, an image transmission apparatus having a function of digitizing and transmitting an image signal acquired by said image sensing apparatus via a network and a function of issuing authorization to control said image sensing apparatus, an image reception apparatus which receives and displays the transmitted digitized image signal, further requests to control said image sensing apparatus, and a network connecting said image transmission apparatus and said image reception apparatus,
wherein, in a case where the authorization to control said image sensing apparatus is issued to said image reception apparatus and communication between said image reception apparatus and said image transmission apparatus is undesirably terminated while said image reception apparatus holds the authorization, after said image reception apparatus restores communication within a predetermined period,
restoring conditions of said image sensing apparatus to the conditions at the time of the undesired termination; and
allowing said image reception apparatus to continuously control said image sensing apparatus under the restored conditions.

20. The control method according to claim 19, comprising a certification step of identifying whether or not said image reception apparatus is allowed to control said image sensing apparatus.

21. The control method according to claim 19, comprising a step of immediately issuing the authorization to control said image sensing apparatus to said image reception apparatus when said image reception apparatus restores the communication within the predetermined period after the undesired termination of the communication.

22. The control method according to claim 19, comprising, in a case where said image reception apparatus restores the communication within the predetermined period after the undesired termination and another image reception apparatus holds authorization to control said image sensing apparatus at the time of the restoration of the communication, a step of giving priority to said restored image reception apparatus to receive the authorization to control said image sensing apparatus after the other image reception apparatus releases the authorization to control said image sensing apparatus.

23. The control method according to claim 22 comprising:
a step of informing said restored image reception apparatus of time to take until said image transmission apparatus issues the authorization to control said image sensing apparatus to said restored image reception apparatus; and
a step of indicating the notified time in said restored image reception apparatus.

24. The control method according to claim 19 comprising:
a reception step of receiving a request for authorization to control said image sensing apparatus after the undesired termination; and
a determination step of determining whether or not an image reception apparatus which requested the authorization is said image reception apparatus whose communication was undesirably terminated while holding an authorization.

25. The control method according to claim 24, wherein, in said determination step, the determination is performed on the basis of an IP (internet protocol) address and a user name of the image reception apparatus which requested the authorization.

26. The control method according to claim 24, wherein, in said determination step, the determination is performed on the basis of a key issued at said image transmission apparatus and a password.

27. A control method for controlling an image distribution system having an image sensing apparatus controllable by an external device, an image transmission apparatus having a function of digitizing and transmitting an image signal acquired by said image sensing apparatus via a network and a function of issuing authorization to control said image sensing apparatus, an image reception apparatus which receives and displays the transmitted digitized image signal, further requests to control said image sensing apparatus, and a network connecting said image transmission apparatus and said image reception apparatus,
wherein, in a case where the authorization to control said image sensing apparatus is issued to said image reception apparatus and communication between said image reception apparatus and said image transmission apparatus is undesirably terminated while said image reception apparatus holds the authorization, after said image reception apparatus restores communication within a predetermined period,
restoring conditions of said image sensing apparatus to the conditions at the time of the undesired termination; and
allowing said image reception apparatus to continuously control said image sensing apparatus under the restored conditions,
wherein said control method further comprising:
a step of suspending the authorization issued to another image reception apparatus in a case where said image reception apparatus restores the communication within the predetermined period after the undesired termination and the other image reception apparatus holds authorization to control said image sensing apparatus at the time of the restoration of the communication; and
a step of issuing authorization to control said image sensing apparatus to said restored image reception apparatus after suspending the authorization issued to the other image reception apparatus.

28. The control method according to claim 27, comprising:
a condition restoration step of restoring conditions of said image sensing apparatus to the conditions at the time of the undesired termination in a case where said image reception apparatus restores the communication within the predetermined period after the undesired termination; and
a step of issuing the authorization to control said image sensing apparatus after said condition restoration step.

29. The control method according to claim 27, comprising a step of determining whether or not said restored image reception apparatus has higher priority than the other image reception apparatus,
wherein in said suspending step, the authorization issued to the other image reception apparatus is suspended when said restored image reception apparatus has higher priority than the other image reception apparatus.

30. The control method according to claim 29, wherein said priority is determined on the basis of time when the image reception apparatuses start controlling said image sensing apparatus.

31. The control method according to claim 29, wherein, when an image reception apparatus is charged for the authorization to control said image sensing apparatus, said priority is determined on the basis of ranks given to the image reception apparatuses in a charging system.

32. A control method for controlling an image distribution system having an image sensing apparatus controllable by an external device, an image transmission apparatus having a function of digitizing and transmitting an image signal acquired by said image sensing apparatus via a network and a function of issuing authorization to control said image sensing apparatus, an image reception apparatus which receives and displays the transmitted digitized image signal, further requests to control said image sensing apparatus, and a network connecting said image transmission apparatus and said image reception apparatus,
wherein, in a case where the authorization to control said image sensing apparatus is issued to said image reception apparatus and communication between said image reception apparatus and said image transmission apparatus is undesirably terminated while said image reception apparatus holds the authorization, after said image reception apparatus restores communication within a predetermined period,
restoring conditions of said image sensing apparatus to the conditions at the time of the undesired termination; and
allowing said image reception apparatus to continuously control said image sensing apparatus under the restored conditions,
wherein said control method further comprising:
issuing the authorization to control said image sensing apparatus after restoring the conditions.

33. A control method for controlling an image distribution system having an image sensing apparatus controllable by an external device, an image transmission apparatus having a function of digitizing and transmitting an image signal acquired by said image sensing apparatus via a network and a function of issuing authorization to control said image sensing apparatus, an image reception apparatus which receives and displays the transmitted digitized image signal, further requests to control said image sensing apparatus, and a network connecting said image transmission apparatus and said image reception apparatus, wherein, in a case where the authorization to control said image sensing apparatus is issued to said image reception apparatus and communication between said image reception apparatus and said image transmission apparatus is undesirably terminated while said image reception apparatus holds the authorization, after said image reception apparatus restores communication within a predetermined period, restoring conditions of said image sensing apparatus to the conditions at the time of the undesired termination; and allowing said image reception apparatus to continuously control said image sensing apparatus under the restored conditions, wherein said control method further comprising an authorization period administration step of setting a period allowed for said image reception apparatus to hold the authorization at the time of restoration of communication after the undesired termination.

34. The control method according to claim 33, wherein, in said authorization period administration step, a period T-t is set for said image reception apparatus at the time of restoration of communication, where T indicates a period which is allowed for an image reception apparatus to hold authorization and t indicates a period elapsed by the time of the termination.

35. The control method according to claim 33, wherein, in said authorization period administration step, a period T-t-s is set for said image reception apparatus at the time of restoration of communication, where T indicates a period which is allowed for an image reception apparatus to hold authorization, t indicates a period elapsed by the time of the termination, and s indicates a period elapsed since the termination of the communication until the restoration of the communication.

36. A computer program product comprising a computer usable medium having computer readable program code means embodied in said medium of a control method for controlling an image distribution system having an image sensing apparatus controllable by an external device, an image transmission apparatus having a function of digitizing and transmitting an image signal acquired by said image sensing apparatus via a network and a function of issuing authorization to control said image sensing apparatus, an image reception apparatus which receives and displays the transmitted digitized image signal, further requests to control said image sensing apparatus, and a network connecting said image transmission apparatus and said image reception apparatus, said product including:

computer readable program code means for, in a case where the authorization to control said image sensing apparatus is issued to said image reception apparatus and communication between said image reception apparatus and said image transmission apparatus is undesirably terminated while said image reception apparatus holds the authorization, after restoring the communication within a predetermined period, restoring conditions of said image sensing apparatus to the conditions at the time of the undesired termination; and computer readable program code means for enabling said image reception apparatus to continuously control said image sensing apparatus under the restored conditions.

37. The computer program product according to claim 36, further comprising computer readable program code means of a certification step for identifying whether or not said image reception apparatus is allowed to control said image sensing apparatus.

38. The computer program product according to claim 36, comprising computer readable program code means for immediately issuing the authorization to control said image sensing apparatus to said image reception apparatus when said image reception apparatus restores the communication within the predetermined period after the undesired termination of the communication.

39. The computer program product according to claim 36, comprising computer readable program code means for, in a case where said image reception apparatus restores the communication within the predetermined period after the undesired termination and another image reception apparatus holds authorization to control said image sensing apparatus at the time of the restoration of the communication, giving priority to said restored image reception apparatus to receive the authorization to control said image sensing apparatus after the other image reception apparatus releases the authorization to control said image sensing apparatus.

40. The computer program product according to claim 39 comprising:

computer readable program code means for informing said restored image reception apparatus of time to take until said image transmission apparatus issues the authorization to control said image sensing apparatus to said restored image reception apparatus; and computer readable program code means for indicating the notified time in said restored image reception apparatus.

41. The computer program product according to claim 36 comprising:

computer readable program code means for receiving a request for authorization to control said image sensing apparatus after the undesired termination; and computer readable program code means for determining whether or not an image reception apparatus which requested the authorization is said image reception apparatus whose communication was undesirably terminated while holding an authorization.

42. A computer program product comprising a computer usable medium having computer readable program code means embodied in said medium of a control method for controlling an image distribution system having an image sensing apparatus controllable by an external device, an image transmission apparatus having a function of digitizing and transmitting an image signal acquired by said image sensing apparatus via a network and a function of issuing authorization to control said image sensing apparatus, an image reception apparatus which receives and displays the transmitted digitized image signal, further requests to control said image sensing apparatus, and a network connecting said image transmission apparatus and said image reception apparatus, said product including:

computer readable program code means for, in a case where the authorization to control said image sensing apparatus is issued to said image reception apparatus and communication between said image reception apparatus and said image transmission apparatus is undesirably terminated while said image reception apparatus holds the authorization, after restoring the communication within a predetermined period, restoring conditions of said image sensing apparatus to the conditions at the time of the undesired termination; and computer readable program code means for enabling, said image reception apparatus to continuously control said image sensing apparatus under the restored conditions, wherein said product further comprising:

computer readable program code means for suspending the authorization issued to another image reception apparatus in a case where said image reception apparatus restores the communication within the predetermined period after the undesired termination and the other image reception apparatus holds authorization to control said image sensing apparatus at the time of the restoration of the communication; and computer readable program code means for issuing authorization to control said image sensing apparatus to said restored image reception apparatus after suspending the authorization issued to the other image reception apparatus.

43. The computer program product according to claim 42, comprising:

computer readable program code means for restoring conditions of said image sensing apparatus to the conditions at the time of the undesired termination in a case where said image reception apparatus restores the communication within the predetermined period after the undesired termination; and computer readable program code means for issuing the authorization to control said image sensing apparatus after restoring the conditions.

44. The computer program product according to claim 42, comprising computer readable program code means for determining whether or not said restored image reception apparatus has higher priority than the other image reception apparatus, wherein the authorization issued to the other image reception apparatus is suspended when said restored image reception apparatus has higher priority than the other image reception apparatus.

45. A computer program product comprising a computer usable medium having computer readable program code means embodied in said medium of a control method for controlling an image distribution system having an image sensing apparatus controllable by an external device, an image transmission apparatus having a function of digitizing and transmitting an image signal acquired by said image sensing apparatus via a network and a function of issuing authorization to control said image sensing apparatus, an image reception apparatus which receives and displays the transmitted digitized image signal, further requests to control said image sensing apparatus, and a network connecting said image transmission apparatus and said image reception apparatus, said product including:

computer readable program code means for, in a case where the authorization to control said image sensing apparatus is issued to said image reception apparatus and communication between said image reception apparatus and said image transmission apparatus is undesirably terminated while said image reception apparatus holds the authorization, after restoring the communication within a predetermined period, restoring conditions of said image sensing apparatus to the conditions at the time of the undesired termination; and computer readable program code means for enabling said image reception apparatus to continuously control said image sensing apparatus under the restored conditions, wherein said product further comprising:

computer readable program code means for issuing the authorization to control said image sensing apparatus after restoring the conditions.

46. A computer program product comprising a computer usable medium having computer readable program code means embodied in said medium of a control method for controlling an image distribution system having an image sensing apparatus controllable by an external device, an image transmission apparatus having a function of digitizing and transmitting an image signal acquired by said image sensing apparatus via a network and a function of issuing authorization to control said image sensing apparatus, an image reception apparatus which receives and displays the transmitted digitized image signal, further requests to control said image sensing apparatus, and a network connecting said image transmission apparatus and said image reception apparatus, said product including:

computer readable program code means for, in a case where the authorization to control said image sensing apparatus is issued to said image reception apparatus and communication between said image reception apparatus and said image transmission apparatus is undesirably terminated while said image reception apparatus holds the authorization, after restoring the communication within a predetermined period, restoring conditions of said image sensing apparatus to the conditions at the time of the undesired termination; and computer readable program code means for enabling said image reception apparatus to continuously control said image sensing apparatus under the restored conditions, wherein said product further comprising computer readable program code means for setting a period allowed for said image reception apparatus to hold the authorization at the time of restoration of communication after the undesired termination.

47. An image transmission apparatus, used in connection with an image sensing apparatus controllable by an external device, having a function of digitizing and transmitting an image signal acquired by said image sensing apparatus via a network and a function of issuing authorization to control said image sensing apparatus, wherein, in a case where the image transmission apparatus issues the authorization to control said image sensing apparatus to an external apparatus and communication between the external apparatus and the image transmission apparatus is undesirably terminated while the external apparatus holds the authorization, after restoring the communication within a predetermined period, the image transmission apparatus restores conditions of said image sensing apparatus to the conditions at the time of the undesired termination, and allows said external apparatus to continuously control said image sensing apparatus under the restored conditions.

48. The image transmission apparatus according to claim 47 comprising certification means for identifying whether or not said external apparatus is allowed to control said image sensing apparatus.

49. The image transmission apparatus according to claim 47, wherein the image transmission apparatus immediately issues the authorization to control said image sensing apparatus to said external apparatus when said external apparatus restores the communication within the predetermined period after the undesired termination of the communication.

50. The image transmission apparatus according to claim 47, wherein, in a case where said external apparatus restores the communication within the predetermined period after the undesired termination and another external apparatus holds authorization to control said image sensing apparatus at the time of the restoration of the communication, the image transmission apparatus gives priority to said restored external apparatus to receive the authorization to control said image sensing apparatus after the other external apparatus releases the authorization to control said image sensing apparatus.

51. The image transmission apparatus according to claim 50, wherein the image transmission apparatus informs said restored external apparatus of time to take until the image transmission apparatus issues the authorization to control said image sensing apparatus to said restored external apparatus.

52. The image transmission apparatus according to claim 47 comprising administration means for, when a request for authorization to control said image sensing apparatus is received after the undesired termination, determining whether or not an external apparatus which requested the authorization is said external apparatus whose communication was undesirably terminated while holding an authorization.

53. The image transmission apparatus according to claim 52, wherein said administration means performs the determination on the basis of an IP (internet protocol) address and a user name of the external apparatus which requested the authorization.

54. The image transmission apparatus according to claim 52, wherein said administration means performs the determination on the basis of a key issued by the image transmission apparatus and a password.

55. The image transmission apparatus according to claim 47, wherein the image transmission apparatus includes said image sensing apparatus.

56. An image transmission apparatus, used in connection with an image sensing apparatus controllable by an external device, having a function of digitizing and transmitting an image signal acquired by said image sensing apparatus via a network and a function of issuing authorization to control said image sensing apparatus,
 wherein, in a case where the image transmission apparatus issues the authorization to control said image sensing apparatus to an external apparatus and communication between the external apparatus and the image transmission apparatus is undesirably terminated while the external apparatus holds the authorization, after restoring the communication within a predetermined period, the image transmission apparatus restores conditions of said image sensing apparatus to the conditions at the time of the undesired termination, and allows said external apparatus to continuously control said image sensing apparatus under the restored conditions,
 wherein, in a case where said external apparatus restores the communication within the predetermined period after the undesired termination and another external apparatus holds authorization to control said image sensing apparatus at the time of the restoration of the communication, the image transmission apparatus suspends the authorization issued to the other external apparatus and issues authorization to control said image sensing apparatus to said restored external apparatus.

57. The image transmission apparatus according to claim 56, wherein, in a case where said external apparatus restores the communication within the predetermined period after the undesired termination, the image transmission apparatus issues the authorization to control said image sensing apparatus after restoring conditions of said image sensing apparatus to the conditions at the time of the undesired termination.

58. The image transmission apparatus according to claim 56, wherein the image transmission apparatus issues the authorization to control said image sensing apparatus to said restored image sensing apparatus after suspending the authorization issued to the other image sensing apparatus if said restored external apparatus has higher priority than the other external apparatus.

59. The image transmission apparatus according to claim 58, wherein said priority is determined on the basis of time when the external apparatuses start controlling said image sensing apparatus.

60. The image transmission apparatus according to claim 58, wherein, when the image transmission apparatus charges an external apparatus for the authorization to control said image sensing apparatus, said priority is determined on the basis of ranks given to the external apparatuses in a charging system.

61. An image transmission apparatus, used in connection with an image sensing apparatus controllable by an external device, having a function of digitizing and transmitting an image signal acquired by said image sensing apparatus via a network and a function of issuing authorization to control said image sensing apparatus,
 wherein, in a case where the image transmission apparatus issues the authorization to control said image sensing apparatus to an external apparatus and communication between the external apparatus and the image transmission apparatus is undesirably terminated while the external apparatus holds the authorization, after restoring the communication within a predetermined period, the image transmission apparatus restores conditions of said image sensing apparatus to the conditions at the time of the undesired termination, and allows said external apparatus to continuously control said image sensing apparatus under the restored conditions,
 wherein the image transmission apparatus issues the authorization to control said image sensing apparatus after restoring the conditions of said image sensing apparatus.

62. An image transmission apparatus, used in connection with an image sensing apparatus controllable by an external device, having a function of digitizing and transmitting an image signal acquired by said image sensing apparatus via a network and a function of issuing authorization to control said image sensing apparatus,
 wherein, in a case where the image transmission apparatus issues the authorization to control said image sensing apparatus to an external apparatus and communication between the external apparatus and the image transmission apparatus is undesirably terminated while the external apparatus holds the authorization, after restoring the communication within a predetermined period, the image transmission apparatus restores conditions of said image sensing apparatus to the conditions at the time of the undesired termination, and allows said external apparatus to continuously control said image sensing apparatus under the restored conditions,
 wherein said image transmission apparatus further comprising authorization period administration means for setting a period allowed for said external apparatus to hold the authorization at the time of restoration of communication after the undesired termination.

63. The image transmission apparatus according to claim 62, wherein said authorization period administration means sets a period T-t for said external apparatus at the time of restoration of communication, where T indicates a period which is allowed for an external apparatus to hold authorization and t indicates a period elapsed by the time of the termination.

64. The image transmission apparatus according to claim 62, wherein said authorization period administration means sets a period T-t-s for said external apparatus at the time of restoration of communication, where T indicates a period which is allowed for an external apparatus to hold authorization, t indicates a period elapsed by the time of the termination, and s indicates a period elapsed since the termination of the communication until the restoration of the communication.

* * * * *

UNITED STATES PATENT AND TRADEMARK OFFICE
CERTIFICATE OF CORRECTION

PATENT NO. : 6,836,287 B1
DATED : December 28, 2004
INVENTOR(S) : Masanori Nakahara It is certified that error appears in the above-identified patent and that said Letters Patent is hereby corrected as shown below:

Title page,
Item [56], References Cited, FOREIGN PATENT DOCUMENTS, please insert
-- JPA 09-098317 --.

Signed and Sealed this

Third Day of May, 2005

JON W. DUDAS
*Director of the United States Patent and Trademark Office*